(12) United States Patent
Knutson

(10) Patent No.: US 12,449,573 B2
(45) Date of Patent: Oct. 21, 2025

(54) DEVICES USING GLASS BOWS

(71) Applicant: Lara Knutson, Beach Haven, NJ (US)

(72) Inventor: Lara Knutson, Beach Haven, NJ (US)

( * ) Notice: Subject to any disclaimer, the term of this patent is extended or adjusted under 35 U.S.C. 154(b) by 82 days.

(21) Appl. No.: 17/166,331

(22) Filed: Feb. 3, 2021

(65) Prior Publication Data

US 2021/0333447 A1  Oct. 28, 2021

Related U.S. Application Data

(63) Continuation-in-part of application No. 16/861,042, filed on Apr. 28, 2020, now Pat. No. 10,962,200.

(51) Int. Cl.
| | |
|---|---|
| G09F 1/04 | (2006.01) |
| F21S 9/02 | (2006.01) |
| F21S 9/04 | (2006.01) |
| F21V 23/04 | (2006.01) |
| G02B 5/12 | (2006.01) |
| G09F 19/18 | (2006.01) |

(52) U.S. Cl.
CPC .......... *G02B 5/12* (2013.01); *F21S 9/02* (2013.01); *F21S 9/04* (2013.01); *F21V 23/04* (2013.01); *G09F 1/04* (2013.01); *G09F 19/18* (2013.01)

(58) Field of Classification Search
CPC ...... A63H 33/38; B42D 15/04; B42D 15/042; G02B 5/12; G09F 1/04; G09F 19/18; G09F 13/00; F21Y 2115/10; F21V 5/002
See application file for complete search history.

(56) References Cited

U.S. PATENT DOCUMENTS

| | | | |
|---|---|---|---|
| 4,587,630 A | 5/1986 | Straton et al. | |
| 5,536,558 A | 7/1996 | Shelton | |
| 10,962,200 B1 * | 3/2021 | Knutson | F21V 13/04 |
| 2006/0237124 A1 | 10/2006 | Bartoli et al. | |
| 2012/0063159 A1 | 3/2012 | Propp | |
| 2013/0301279 A1 * | 11/2013 | Knutson | G09F 13/02 |
| | | | 29/428 |
| 2015/0003045 A1 | 1/2015 | Ho | |
| 2016/0063876 A1 * | 3/2016 | Javidan | G09B 5/06 |
| | | | 715/201 |
| 2016/0356929 A1 | 12/2016 | Knutson | |
| 2018/0261134 A1 * | 9/2018 | Sebastian | G09F 1/06 |
| 2020/0082147 A1 | 3/2020 | Thuillier et al. | |
| 2021/0122302 A1 * | 4/2021 | McClelland | B60Q 1/56 |
| 2021/0198000 A1 * | 7/2021 | Sun | B65D 25/02 |

FOREIGN PATENT DOCUMENTS

| | | | | | |
|---|---|---|---|---|---|
| KR | 20100100069 A | * | 9/2015 | | F21V 23/04 |
| WO | WO-2017/037061 A1 | | 8/2016 | | |
| WO | WO-2021221950 A1 | * | 11/2021 | | A45F 3/04 |

OTHER PUBLICATIONS

U.S. Appl. No. 16/861,042, filed Apr. 28, 2020, U.S. Pat. No. 10,962,200, Issued.

(Continued)

*Primary Examiner* — Cassandra Davis
(74) *Attorney, Agent, or Firm* — Walter Scott

(57) ABSTRACT

A pop-up having a glass bow are produced by shining a point light source on a reflective and refractive surface. The pop-up with a glass bow might be incorporated into a card or a book.

11 Claims, 21 Drawing Sheets

(56) References Cited

OTHER PUBLICATIONS

"Glass Bead Bow on Tarmac" Atmospheric Phenomena, Unusual Phenomena Around the World, Blog Archives, Retrieved from the Internet: URL: https://atoptics.wordpress.com/2013/09/17/glass-bead-bow-on-tarmac/ [Retrieved on May 22, 2020] dated Sep. 17, 2013.
"Optical Effects in Air, Water and Ice", Retrieved from the Internet: URL:http://www.dewbow.co.uk/index.html> [Retrieved on Apr. 20, 2020], dated Apr. 2, 2013.
"Rainbow Formation" Retrieved from the Internet: URL:https://www.physicsclassroom.com/class/refrn/Lesson-4/Rainbow-Formation> [Retrieved on Apr. 20, 2020], The Physics Classroom.
Ferrell, J. "Photo of a Glass Bead Rainbow", Weather Blogs, dated Jul. 14, 2010 Retrieved from the Internet: URL: https://www.accuweather.com/en/weather-blogs/weathermatrix/photo-of-a-glass-bead-rainbow/58973 [Retrieved on May 22, 2020].
International Search Report and Written Opinion for PCT/US2021/28096 (ISA/US) mailed Jul. 27, 2021 (11 pages).

* cited by examiner

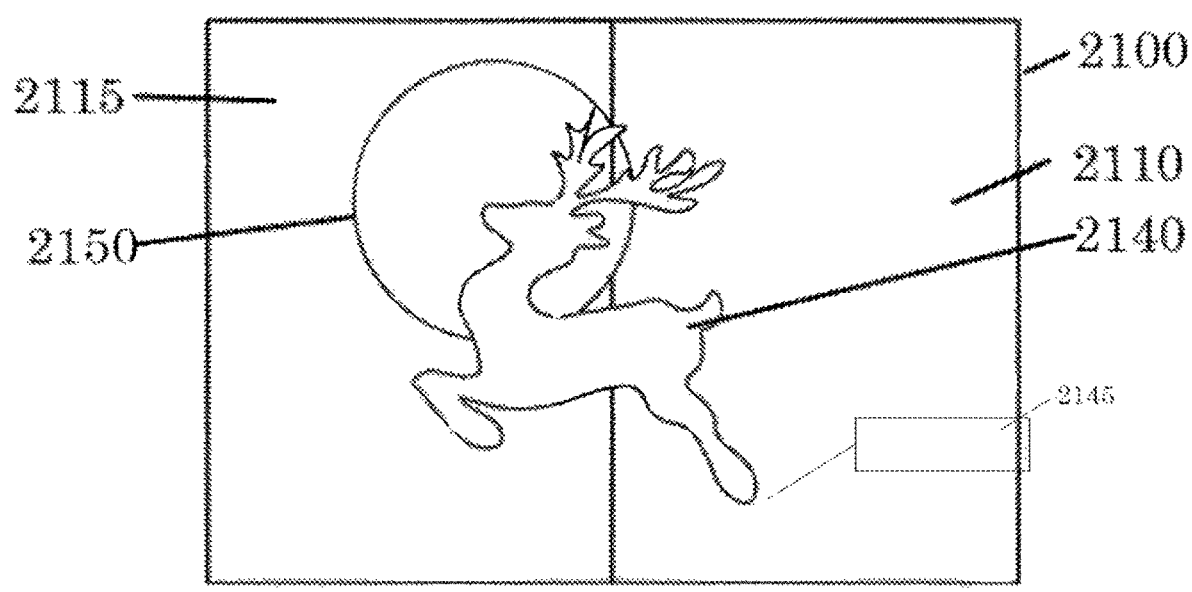

DEVICES USING GLASS BOWS

PRIORITY CLAIM

This application claims priority to and the benefit of U.S. patent application Ser. No. 17/166,331, filed Feb. 3, 2021 and U.S. patent application Ser. No. 16/861,042, filed Apr. 28, 2020 now U.S. Pat. No. 10,962,200 issued on Mar. 30, 2021.

BACKGROUND OF THE INVENTION

Field of the Invention

The present invention generally relates to a display device and a method for creating a display. Specifically, the present invention relates to a method of using certain refractive materials and devices using such refractive materials for creating a glass bow display effect, such as a glory or a circular, white, glass bow. By using the device and method disclosed herein a display can be created heretofore unrealized results.

Description of the Related Art

Certain light phenomena such as glories, bows, and halos have long been known to physicists who study the atmosphere. The most well know of these phenomena is a rainbow. Examples of such phenomena are described, for instance, at http://www.dewbow.co.uldindex.html (viewed on Apr. 14, 2020). One specific type of bow that has been identified is the glass bow. See e.g., https://atoptics.wordpress.com/?s=glass+bow (viewed Apr. 14, 2020).

A rainbow is formed by "collection of suspended water droplets in the atmosphere serves as a refractor of light. The water represents a medium with a different optical density than the surrounding air. Light waves refract when they cross over the boundary from one medium to another. The decrease in speed upon entry of light into a water droplet causes a bending of the path of light towards the normal. And upon exiting the droplet, light speeds up and bends away from the normal. The droplet causes a deviation in the path of light as it enters and exits the drop." https://www.physicsclassroom.com/class/refrn/Lesson-4/Rainbow-Formation (viewed Apr. 14, 2020).

A similar phenomenon, the glass bow, has been observed with light that is reflected and refracted by small, transparent, glass and/or plastic beads. https://atoptics.wordpress.com/?s=glass+bow (viewed Apr. 14, 2020).

To date, the use of such small, transparent glass and/or plastic beads that reflect and refract light has been limited. For instance, such beads are commonly used in Signage. Signage is widespread, yet it is often difficult to capture the attention of the typical viewer, for example, a pedestrian, driver, potential customer, or patron. Many displays have been created in order to get a viewer's attention that meet with varied success. Further, many displays have been created in order to get the attention of potential shoppers, yet these are not all successful in this regard. There is therefore a great need in the art for creating a display that effectively captures the attention of a viewer.

Accordingly, there is now provided with this invention an improved method and display device effectively overcoming the aforementioned difficulties and longstanding problems inherent in present displays. These problems have been solved in a simple, convenient, and highly effective way by which to create a display. More particularly, a glass bow effect is created by the present invention which calls attention to the display in a way not previously achieved.

SUMMARY OF THE INVENTION

According to one aspect of the invention, a display device is disclosed. The display device comprises a substrate, a first layer attached to the substrate comprising glass beads and preferably at least one pigment, and an LED light source for shining upon the first layer and thereby creating a glass bow halo effect.

According to another aspect of the invention, a display device is disclosed. The display device comprises a substrate, a first layer attached to the substrate comprising glass beads and preferably at least one pigment, a reflective and refractive layer interposed between the substrate and the first layer, and an LED light source for shining upon the first layer and thereby creating a glass bow halo effect.

According to yet another aspect of the invention, a method for creating a display is disclosed. The method comprises attaching a first layer to a substrate, wherein the first layer comprises glass beads and preferably at least one pigment and shining a first light from a first LED source onto the first layer so that a glass bow halo effect occurs.

As will be appreciated by those persons skilled in the art, a major advantage provided by the present invention is creating a glass bow display device and method. Additional objects of the present invention will become apparent from the following description.

In one embodiment of the present invention, beads are embedded in a substrate to form the reflective and refractive layer. Preferably, the beads are made of glass or plastic. While non-spherical structures may be used in making the reflective and refractive material, it is also preferred that the beads are transparent and spherical. It is also preferred that the beads are partially embedded into a substrate. Preferably, less than two thirds of each of the beads are embedded (submerged) into the substrate. It is further preferred that less than about one half of each of the beads is submerged into the substrate. It is still further preferred that about one third of each bead is submerged into the substrate.

Typically, the beads have a diameter of between about 1 µm and about 100 µm. It is preferred that the beads have a diameter of between about 30 µm and about 70 µm. It is further preferred that the beads have a diameter of between about 40 µm and about 65 µm. The diameter of the beads within a specified bead diameter range need not be uniform.

It is believed that the refractive Index ("$R_i$") of the beads is also an important characteristic of beads useful in the present invention. Typically, the beads used in the practice of the present invention have an Ry of between about 1.1 and about 1.9. Preferably the beads used in the practice have an $R_I$ of about 1.4 to about 1.6, and more preferred are beads with an $R_1$ of at least about 1.5.

It is understood that the claimed device makes use of the phenomenon of retro-reflection, whereby light waves are reflected on a path approximately parallel to their initial path. Retroreflection in the device described in the application is accomplished through microbeads embedded into a layer in the device. As a localized light source is placed in close proximity to the surface of the device, light waves from this light source are partially refracted by the beads, but largely retroreflect back towards the light source. The partial refraction causes a concentration of light surrounding the light source, generating the appearance of a floating image above the reflective and refractive surface, which the application terms a "halo". The closer the light is placed to the surface, the more concentrated this "halo" image appears.

Embodiments of the present invention typically employ a point light source. Examples of such point light source include: light-emitting diodes ("LED's"); organic light-emitting diode ("OLED's"); Candle Light; a pinhole light source and lasers. It is preferred that the light emitted from the point light source is polychromatic and not polarized.

The light emitted by a point light source employed by an embodiment of the present invention is typically between about 5 lm (lumens) and about 600 lm. It is preferred that the light emitted by a point light source employed by an embodiment of the present invention is between about 10 lm and about 500 lm, and it is more preferred that the light emitted by a point light source employed by an embodiment of the present invention is between about 10 lm and about 100 lm.

The method and apparatus of the present invention will be better understood by reference to the following detailed discussion of specific embodiments and the attached figures which illustrate and exemplify such embodiments.

BRIEF DESCRIPTION OF THE SEVERAL VIEWS OF THE DRAWINGS

A specific embodiment of the present invention will be described with reference to the following drawings, wherein:

FIG. 19A illustrates an open, prior art popup card; FIG. 19B illustrates the notch in a prior art popup card that raises the "popup" aspect of the card; FIG. 19C illustrates the popup notch of a prior art popup card in an unpopped-up position; and FIG. 19D illustrates the popup notch in a popped up position.

DESCRIPTION OF THE PREFERRED EMBODIMENT

The following preferred embodiment as exemplified by the drawings is illustrative of the invention and is not intended to limit the invention as encompassed by the claims of this application. An apparatus and method for displaying a glass bow effect is disclosed herein.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described herein. The materials, methods, and examples are illustrative only and not intended to be limiting. Other features of the disclosure are apparent from the following detailed description and the claims.

As used herein, the term "pop-up" refers to an article of manufacture having at least two surfaces that can be in a state where the surfaces are in contact, or in a state where at least two surfaces are separated. When two surfaces of a pop-up are separated, a structure arises between the two surfaces. Classic examples of a pop-up include cards and books, however a pop-up may take another form. See e.g., https://web.archive.org/web/20190407021242/https://www.hallmark.com/pop-up-carts/and https://www.uncommongoods.com/product/classic-fairytale-pop-up-book.

Figure 1:
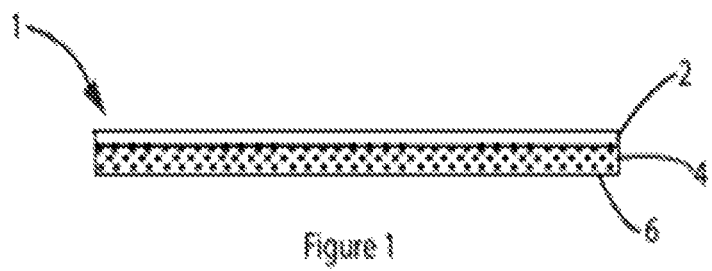
FIG. 1 is a schematic drawing of an embodiment of the reflective and refractive surface used in the present invention.

As illustrated generally in FIGS. 1-5, a display device 1 is shown. The display device, shown in FIG. 1 comprises a substrate 2 onto which a first layer 4 is positioned. The substrate illustrated in FIG. 1 is generally flat and is reflective and refractive. The substrate may be of a fairly rigid material or be somewhat flexible depending on the surface to which it is to be attached and for the particular use intended.

The first layer 4 comprises glass beads 6 and at least one pigment. The first layer may be, for example, a fabric comprising glass beads 6 and at least one pigment. The fabric may be, for example, 57% PU coagulate and 43% a polyester/cotton 48/52 textile. The glass beads may be on the fabric as a monolayer or may, alternatively, be multilayered.

Such a fabric may be provided, for example, by I.B.R. Reflective Technologies, Via Pederzola 1/3, 24020 Scanzorosciate, Italy as described in Technical Data Sheet MI-SP20, and U.S. Patent Application Publication No. 2006/0237124. As described therein, the fabric is a textile-reinforced polyurethane coagulate coated with a monolayer of glass beads. The glass beads have a low refractive index and typically are in the form of microbeads. The pigment may be a metal grey shade, or alternatively, be selected from a broad color palette.

Typically, the reflective and refractive surface used in the embodiments of the present invention has a fabric or polymer substrate. However, the substrate can also be glass or metal. Moreover, the substrate may be a specific color or it may be multicolored. Additionally, the substrate can be rigid or flexible and it can be flat, concave, or convex. Furthermore, the substrate may have one or more perforations and if there are multiple perforations, that may be of a uniform or of random patterns.

The reflective and refractive layer itself may be microbeads, for example, approximately 15% low refractive index microbeads. The microbeads may be transparent. Further specifications of I.B.R. Reflective Technologies are denoted below.

| Physical Properties (*) | Value (*) Unit | Method (*) |
|---|---|---|
| Retroreflection Coeff. R (5°, 12°) | <3 cd/lux/m² | ITP 01-CIE 54 |
| Weight | 560 ± 50 g/m² | ITP 04 |
| Thickness | 1.0 ± 0.1 mm | ITP 12 |
| Tensile Strength [L/W] | >400/>400N/5 cm | ITP 06 |
| Break Elongation [L/W] | <25/<35% | ITP 06 |
| Flexions (Bally) | >40000 cycles no | ITP 14 |
| Tear Strength [L/W] (trouser) | >18/>15N | ITP 07 |

Figure 2:
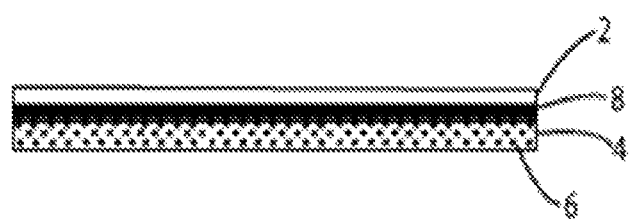
FIG. 2 is a schematic drawing of another embodiment of the reflective and refractive surface used in the present invention.

As shown in FIG. 2, an adhesive layer 8 may be interposed between the substrate 2 and the first layer 4. The adhesive layer may be transparent or may comprise, for example, 85% adhesive and 15% pigments and additives.

The coefficient of retroreflection, RA (in cd/lux/m2) of the reflective and refractive surface used in embodiments of the present invention is between about 0.2 and about 250. It is preferred that RA of the reflective and refractive surface used in embodiments of the present invention is between about 0.2 and about 100. It is further preferred that RA of the reflective and refractive surface used in embodiments of the present invention is between about 0.3 and about 50. It is most preferred that RA of the reflective and refractive surface used in embodiments of the present invention is between about 0.3 and about 30.

Figure 4:
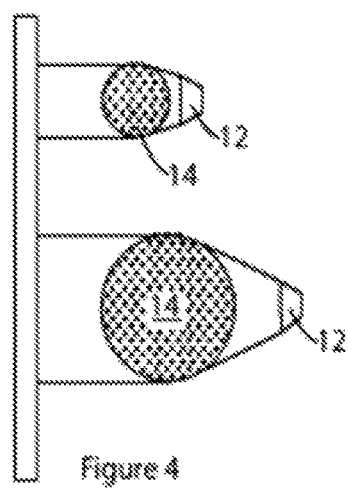
FIG. 4 is a schematic drawing illustrating the glass bow created by shining a point source light at different distances from a reflective and refractive surface of the present invention on the reflective and refractive surface.

FIG. 4 is a schematic drawing of the present invention illustrating the effects of illuminations at different distances from the reflective and refractive surface. Specifically, FIG. 4 illustrates the display 1 illuminated by a point light source 12 thereby forming a glass bow effect (typically a sphere effect) 14. The point light source in this illustrative embodiment is an LED light source. The proximity of the light in relation to the reflective and refractive surface changes the light intensity and color saturation. All LED's in all forms at any wattage are effective light sources. In the instant invention, incident light is scattered from the surface in a distinct way, looking very different than similar reflective products illuminated by an LED light source.

The display may be illustrated by a single light source or by multiple light sources. The light source may be fixed or may be rotated. The light source may be monochromatic, multiple wavelengths, or whitelight with a wavelength of between about 10 nm and about 1600 nm. If more than one light source is used, they may be the same wavelength or be of different wavelengths. The light sources may be at the same distance from the display or at different distances. The light sources can be layered, and colors can be mixed. Patterns can be created by layering the light sources. Depending on the intensity of the light, a corona or glory type effect is typically formed around the edge of the sphere effect 14. The brighter the light, the more solid the sphere effect appears.

As shown in FIG. 4, when the light source 12 is positioned close to the display 1, the glass bow effect 14 appears smaller than when the light source is positioned further away from the display. The light source may illuminate the display at any angle, oblique or acute. For example, the angle of incidence of the illumination from the light source onto the display may range from about 0° to 90°. The optimal angle is 90°.

Figure 5:
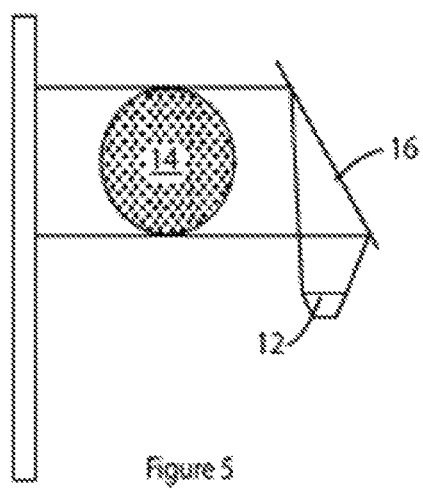
FIG. 5 is a schematic drawing of the present invention illustrating the glass bow effect of a redirected light source.

FIG. 5 is a schematic drawing of the present invention illustrating the effect of a light source redirected onto the display 1. The light source of the present invention does not have to directly illuminate the display. As shown in FIG. 5, the illumination from the light source may be redirected onto the display from a reflecting surface 16. Of course, as understood by persons skilled in the art, multiple redirections of the illumination may occur before the light emanating from the light source is incident upon the display which can strike the display at any angle ranging from about 0° to 90°.

Figure 3:
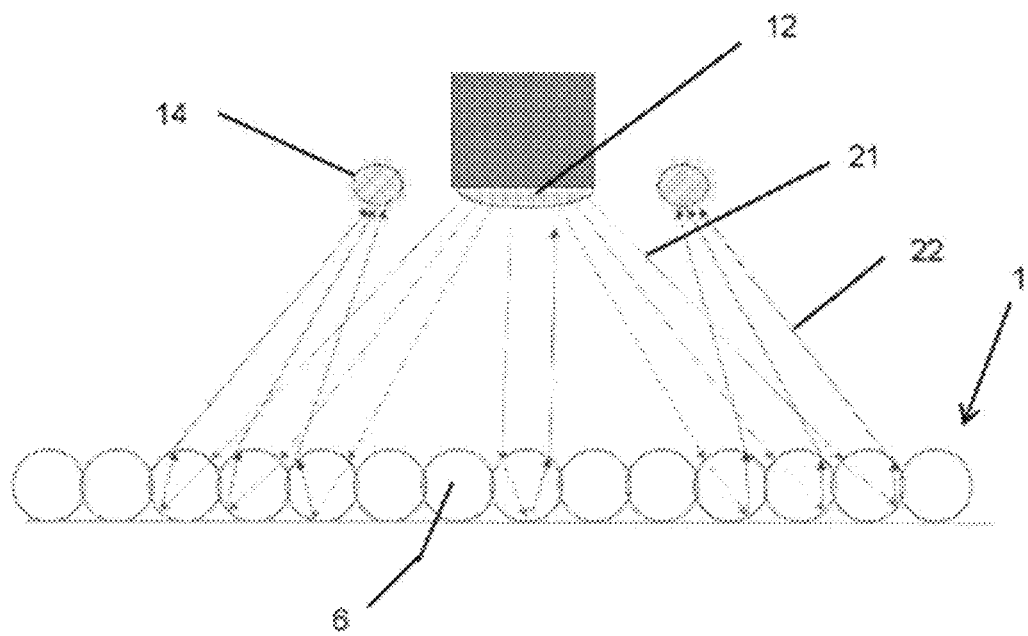
FIG. 3 is an alternative schematic drawing of an embodiment of the present invention.

In the embodiment depicted in FIG. 3, light source 12 shines light on display 1. Incidental light, depicted by rays 21, is retroreflected at least in part through glass beads 6, depicted by rays 22, thus creating an interference pattern above display 1 that results in the appearance of image 14 above the display.

The glass bow produced by the present invention can be made to flicker by using a computing device to dim and re-brighten the point source light by reducing and increasing the power supplied to the point source light. When a plurality of point light sources are used, the point source lights can be individually, or a subset of point source lights collectively, can be dimed and re-brightened.

In alternative embodiments of the present invention, the point light sources, e.g., LEDs may have different colors, or the LEDs can emit light of different colors in response to an instruction from a computing device.

As used herein, the term computing device refers to a device with a programable processor and includes the programing. For example, a microcomputer or a smart phone are non-limiting examples of a computing device.

Example 1: An Ornamental Display

Figure 17:
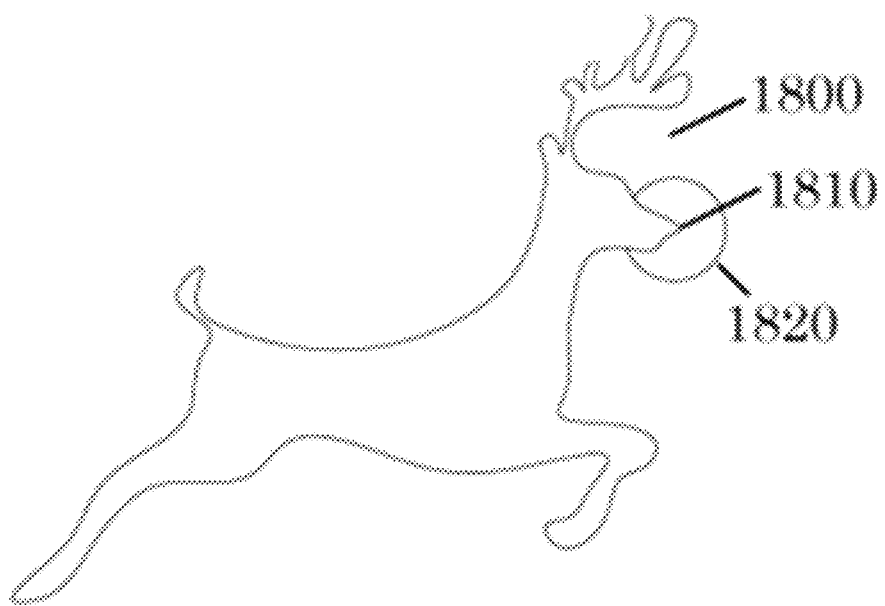
FIG. 17 illustrates an ornamental object in which a feature of the object is highlighted with a glass bow in accordance with the present invention.

Example 1: As shown in FIG. 17, a portion of Ornamental object 1800—for instance a reindeer—nose 1810 can be highlighted with a glass bow 1820. A point light source (not shown) is mounted behind ornamental object 1800 and is shining on a reflective and refractive surface further away from ornamental object 1800. The light is reflected and refracted by the reflective and refractive surface and projects a glass bow on the ornamental object. The point light source can be positioned so that the path the light it emits forms an angle in its travel to the reflective and refractive surface and then to the aspect of the ornamental object that is to be highlighted. Additionally, the back surface of the ornamental surface can be flat, concave, or convex. In a further embodiment of the present invention, there is a second opaque object to be highlighted with a glass bow.

In one embodiment of the present invention, an ornamental display is prepared by positioning a shaped ornamental object in front of a reflective and refractive surface. Preferably the reflective and refractive surface has a retroreflection coefficient (in cd/lux/m$^2$) of between about 0.2 and about 250. The shaped ornamental object is positioned between about 1 cm and 2 meters in front of said reflective and refractive surface. The shaped ornamental object has a thickness of between about 5 mm and about 50 cm.

The shaped ornamental object has a front and a back surface and when the shaped ornamental object is positioned in front of the reflective and refractive surface, the back surface of the shaped ornamental object is facing the reflective and refractive surface. The shaped ornamental object also has an edge between said front and back surfaces.

Additionally, the shaped ornamental object includes one or more features that can be highlighted.

Mounted on the back surface of said shaped ornamental object is a light source. In one embodiment of the present invention, the light source is mounted on the back surface of said shaped ornamental object in proximity to a feature to be highlighted. Typically, the light source is mounted between about 5 mm and 2 m from an edge of said shaped ornamental object in the direction of said reflective and refractive surface. When determining how far to place the point light source away from the object in the direction of the reflective and refractive surface, the point light source associated with a narrower objects may usefully be placed closer the reflective and refractive surface than larger objects.

The light source may be monochromatic, multiple wavelengths, or white light with a wavelength of between about 10 nm and about 1600 nm. Typically for an ornamental object, the wavelength of light emitted by the light source is between about 400 nm to about 700 nm. When a nimbus of a specific color is desired, the light emitted by the source may be filtered to only permit a narrower range of wavelengths to be reflected by the reflective and refractive surface. For instance, if a red nimbus were desired, then only light having a wavelength between about 635 nm and about 700 nm should be reflected by the reflective and refractive surface. For instance, if an orange nimbus were desired, then only light having a wavelength between about 590 nm and about 635 nm should be reflected by the reflective and refractive surface. For instance, if a yellow nimbus were desired, then only light having a wavelength between about 560 nm and about 590 nm should be reflected by the reflective and refractive surface. For instance, if a green nimbus were desired, then only light having a wavelength between about 520 nm and about 560 nm should be reflected by the reflective and refractive surface.

Additionally, a power source is connected to said light source. In one embodiment of the present invention, the power source is a battery, more preferably a rechargeable battery. In an alternative embodiment of the present invention, the power source is an appropriate connection the building electric power. In a further embodiment of the present invention, the power delivered to the one or more point light sources is controlled by a computing device. In yet a further embodiment of the present invention, the power source can be an external solar panel.

Example 2: A Clock

A Clock—a clock in which LED lights tell time in hour, minute and second locations. Forms can vary and halo created can mix color in space. The 3d effect can move around space and overlap on the surface to tell time. The numbers can also be in a mesh and project onto the surface. The lights are on the mesh and will light up to spell out numbers.

Figure 7A:
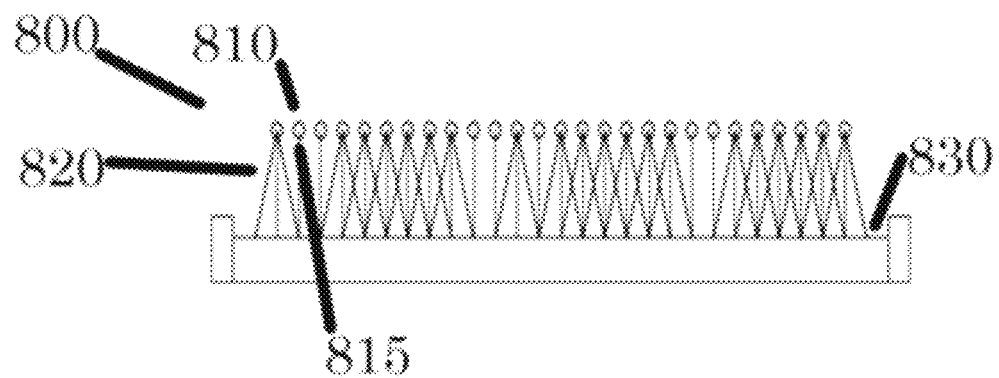
FIG. 7A is a top view of an array of lighting pins of an embodiment of a digital clock embodiment of the present invention.

Turning to FIG. 7A which shows a top view of an embodiment of digital clock 800 according to the present invention. Digital clock 800 has a surface 830 (which can be flat, concave or convex) having mounted thereon an array of lighting pins 810. Surface 830 comprises a reflective and refractive surface of the type described herein.

Each lighting pin 810 comprises wiring (not shown, and preferably inside the pin) that delivers power to light source 815 mounted near the exterior of said pin near the end of the pin furthest from the surface on which the pins are mounted. Additionally, each of said lighting sources are arranged to direct their light on the reflective and refractive surface, see light cone 820.

The wiring from each pin is powered, or turned off, by a computing device which determines which pins should be powered to display the current time.

When the computing device powers an arrangement of the first seven columns of lighting pins (i.e. the left hand side), a plurality of nimbuses are created above the reflective and refractive surface and about the pins of these seven columns of lighting pins that are perceived as a number from 1 to 12 corresponding to the current hour.

In an example of a digital clock according to the present invention, the fourth, eighth, tenth, and fourteenth columns of lighting pins are typically always off to separate the numbers being displayed.

In an example of a digital clock according to the present invention, in the ninth column of lighting pins, the lighting pins in the second and fifth rows, and only those two pins, are always on to separate the current hour from the current number of minutes past the last hour.

Figure 7B:
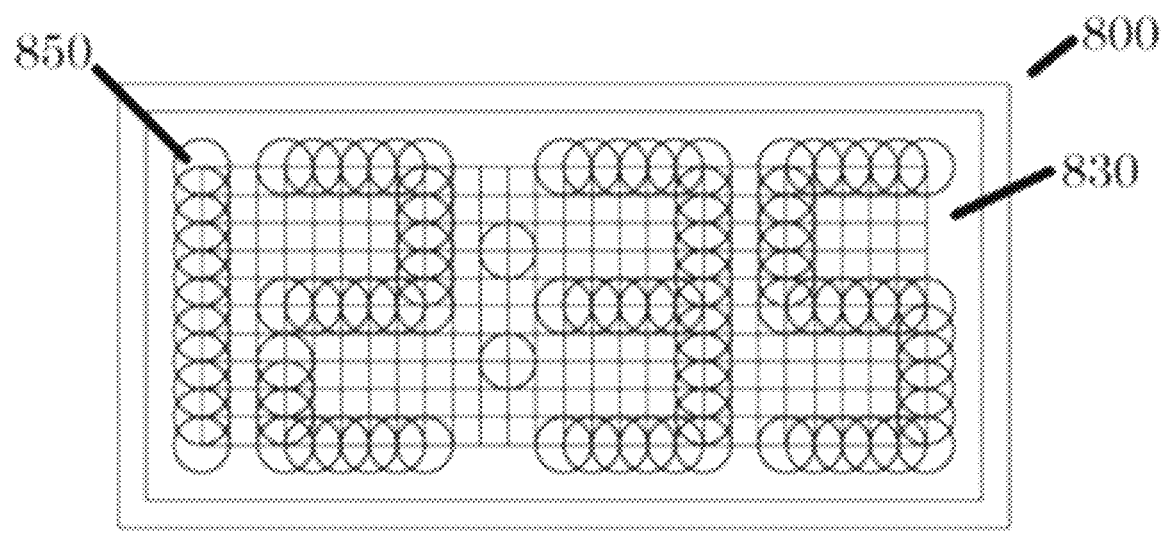
FIG. 7B is a front view of an array of lighting pins of an embodiment of the digital clock embodiment of FIG. 7A.

As shown in FIG. 7B, when the computing device (not shown) powers an arrangement of the columns of lighting pins on the right hand side, a plurality of nimbuses, or glass bows, 850 are created above and about the end of the lighting pins furthest from the reflective and refractive surface that are perceived as a number from 1 to 60, corresponding to the number of minutes since the current hour began.

In an alternative embodiment of this clock, a wave guide runs up the interior of each of the lighting pins and after the wave guide exits the end of its lighting pin at the end of the lighting pin furthest from the reflective and refractive surface and shines on the reflective and refractive surface.

In this alternative embodiment of the clock of the present invention, which pins shine light via their wave guides is controlled by a computing device.

In a still further alternative embodiment of the clock of the present invention, a plurality of lighting pins, each with three different color point light sources are mounted on a reflective and refractive surface in a plurality of circular rows. Preferable, each row comprises 60 lighting pins.

This still further alternative embodiment of the clock of the present invention also comprises a computing device to control which color on which lighting pins are on at any time. For instance, a radius of blue lighting pins could indicate the hour, a radius of red lighting pins could indicate the minute, and a radius of yellow lighting pins could indicate the second. See FIGS. 8A, 8B, and 8C.

Figure 8A:
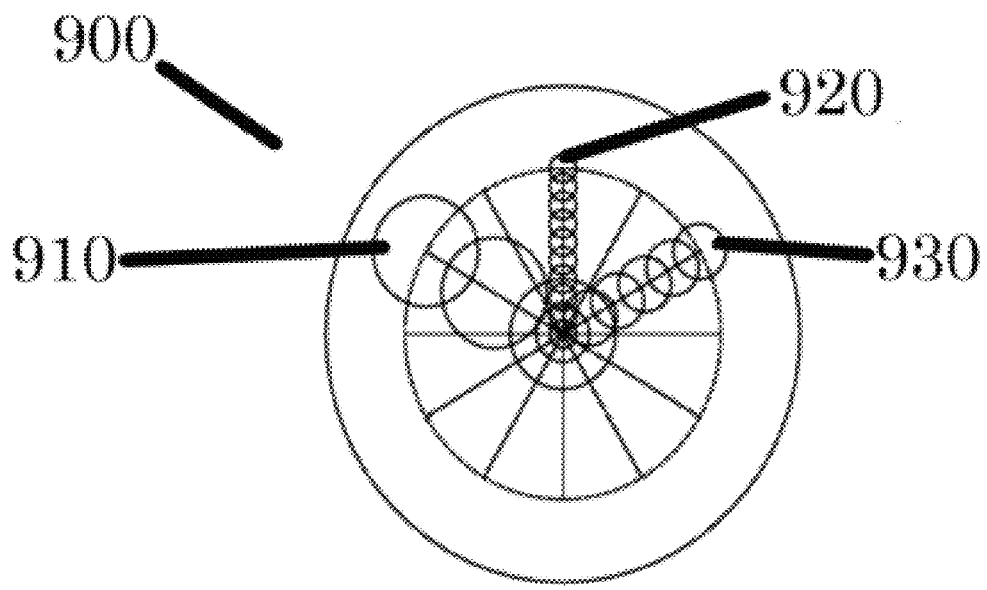
FIG. 8A is a front view of a further embodiment of a clock according to the present invention.

Turning to FIG. 8A, clock 900 has second hand 920, minute hand 930, and hour hand 910, each formed by a plurality of glass bows. In a preferred embodiment of clock 900, the point light sources creating the second hand are all of a first color, the point light sources creating the minute hand are all of a second color, and the point light sources creating the hour hand are all of a third color.

Figure 8B:
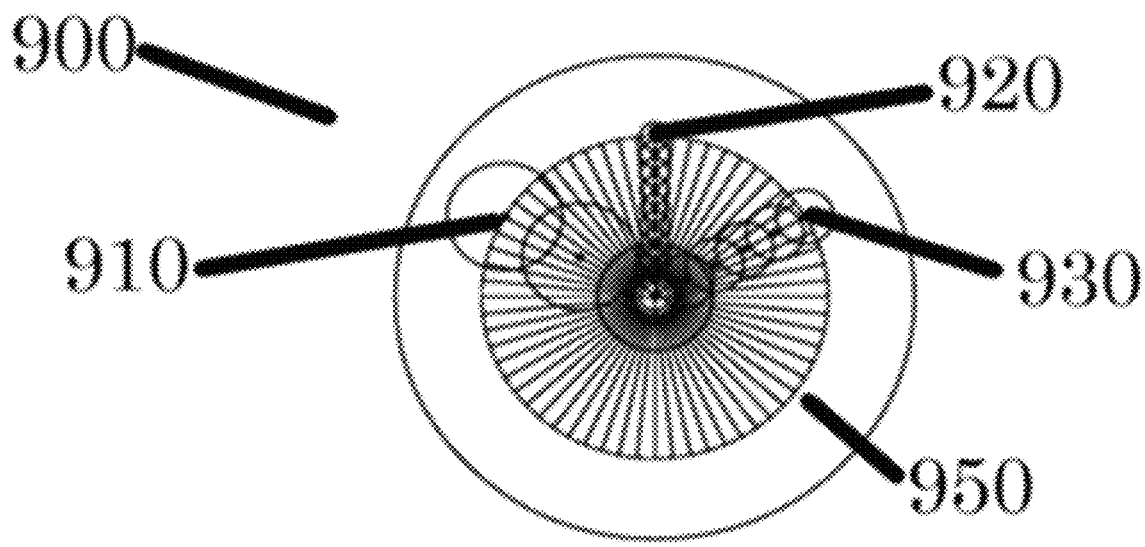
FIG. 8B is another front view of the clock embodiment of FIG. 8A showing the plurality of radii formed from lighting pins.
Figure 8C:
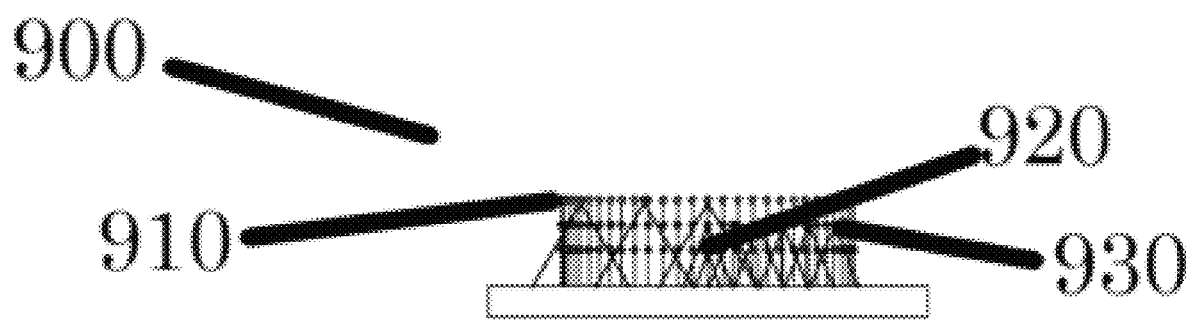
FIG. 8C is a side view of the clock embodiment of FIG. 8A showing the cones of lights from three distinct point light sources on each lighting pin.

FIG. 8B shows that clock 900 has a plurality of radii 950 formed from lighting pins FIG. 8C shows a side view of clock 900. As shown in this view, each lighting pin has three point light sources. The three point light sources on each lighting pin are at different heights. The point light sources that are furthest from the clock face produce the largest glass bows. The point light sources that are closest to the clock face produce the narrowest glass bows and the intermediate point light sources produce an intermediate sized glass bow.

Example 3: A No Touch Button

A no-touch button—painted surface with glass microspheres that is illuminated by LEDs or OLED's or any point light source to create a glass bow light effect that, when interrupted, turns on and activates something.

Because such a no-touch button does not provide the user with immediate feedback that the button was activated, the use of such a button can be accompanied by a lighting change, a noise, or both to signify to the user that the button was activated. For instance, when the no-touch button is activated, it can change color, or the color light can turn off when activated. Alternatively, when the no-touch button is activated, it can be accompanied by a "Noise" to indicate that a function happened. Additionally, a no-touch button of the present invention can be activated with a body part such as a finger, or by using a stylus etc.

Figure 6:
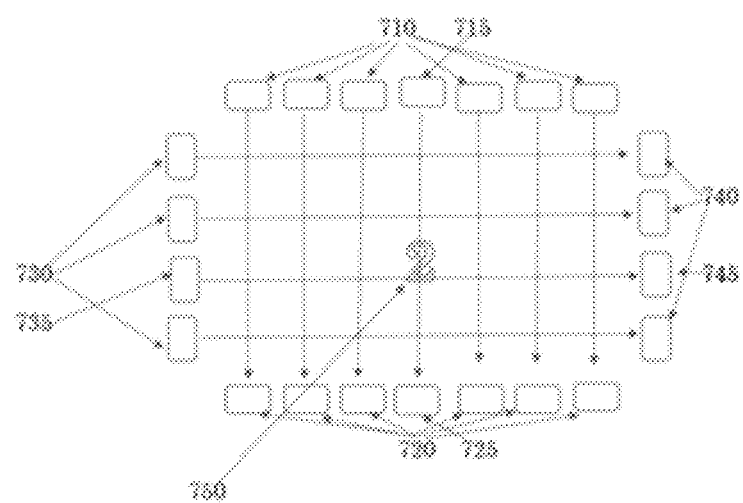
FIG. 6 is a schematic representation of an embodiment of a touchless button of the present invention.

FIG. 6 illustrates an embodiment of a no touch button. An image 750 is created away from a surface. In one embodiment, image 750 is the nimbus created about an object by shining a point light source on a reflective and refractive surface comprising a layer of glass beads having a refractive index of about 1.5, and a coefficient of retroreflection of about 3 cd/lux/m2.

The embodiment of FIG. 6 includes an array of lights 710 and 730, each shining on one or more photodetectors 720 and 740. Lights 710 and 730 and photodetectors 720 and 740 are positions away from a surface, and in alignment with each other.

A person wishing to activate something, e.g., an elevator or an appliance, touches image 750, and in doing so, interrupts the light from lights 710 and 730 before it reaches photodetectors 720 and 740. In this example, the light from lights 715 and 735, when image 750 is touched the light from lights 715 and 735 is interrupted before it reaches photodetectors 725 and 745. These interruptions are interpreted by a computing device (not shown) such as that described in U.S. Pat. No. 4,587,630 to Straton et al., which patent is hereby incorporated by reference. In this embodiment, this touch to image 750 is interpreted by the computing device as a command to activate an action, such as making an elevator go to the second floor of a building without the person who wishes to initiate such action touching a surface.

In alternative embodiments of the present invention, the "touching" of the no-touch button of the present invention is determined by the use of a motion or heat sensor.

In a further alternative embodiment of the no-touch button of the present invention, the no-touch button has a plurality of cameras the take images of the fingerprint(s) used to activate the no-touch button. The images generated are then processed by a system such as that described in Published U.S. patent application No. 20200082147 of Thuillier et al.

Example 4: A No Touch Keyboard

A no-touch Keyboard—a flat or dimensional surface that is coated with microspheres that allows for a light source to project onto to the glass surface to create a visual 3D light effect. It could be activated with a heat sensor or motion sensor. When the user uses fingers/hand/stylus or an object near the surface. The light source can come from the any part of the keyboard and project onto the glass surface.

An embodiment of the no touch keyboard of the present invention comprises an array of images 750 of Example 3 in which each of the keys of a keyboard has its own image 750, each of which exists at a position spaced away from any surface. The plurality of keyboard key images are within an array of lights and photodetectors (corresponding to lights 710 and 730 and photodetectors 720 and 740 of FIG. 6) so that the associated computing device (see U.S. Pat. No. 4,587,630 to Straton et al.) can ascertain which keys were intended to be activated and in which order.

Example 5: A Backpack Turn Signal Indicator

Example 5: A backpack—light indicator on a bag made with "the material" that indicates directions turn signals, breaks, speed and any other necessary information for road safety. It could be connected to a mechanism controlled by the bag wearer.

Figure 18A:
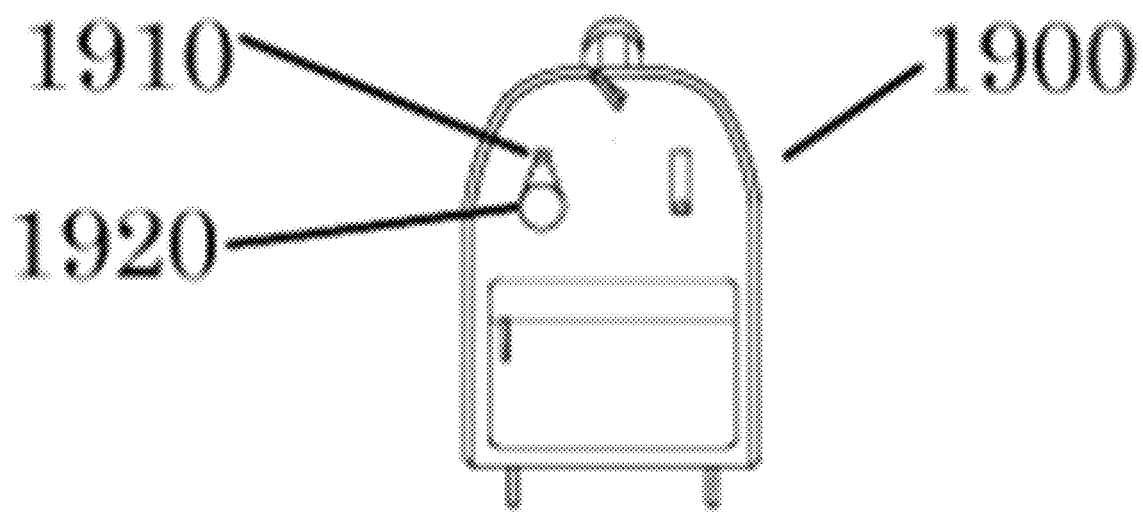
FIG. 18A is a back view of a backpack embodiment of the present invention.

FIG. 18A illustrates the back of a preferred backpack embodiment of the present invention. Backpack 1900 has mounted on its back surface a hinged arm at 1910. When the user does not want to generate a glass bow on the back of the backpack, hinged arm 1910 is rotated to lie against the back surface of backpack 1900. When the user wants to generate a glass bow on the back of the backpack, hinged arm 1920 is rotated to be approximately perpendicular to the back of backpack.

Figure 18B:
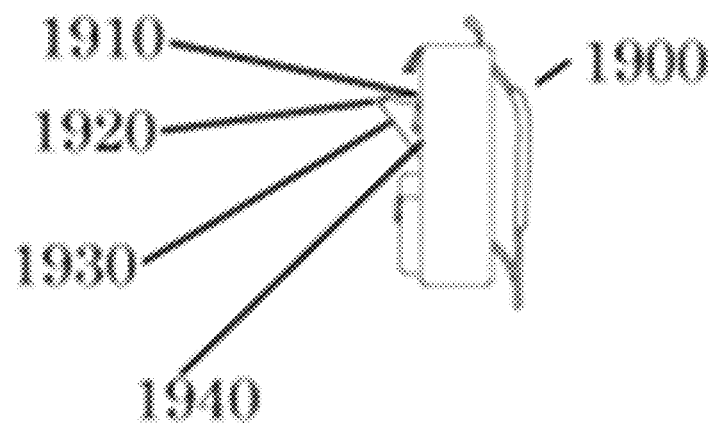
FIG. 18B is a side view of the backpack embodiment of FIG. 18A.

At the end of hinged arm 1910 is mounted a point light source (not seen in FIG. 18A). When hinged arm 1910 is positioned perpendicular to the backpack (see FIG. 18B), point light source at 1920 shines a cone of light 1930 on reflective and refractive surface 1940. Shining this light on reflective and refractive surface 1940 produces a glass bow.

In an alternative embodiment of backpack 1900 of the present invention, hinged arm 1920 is mounted on the back of the backpack, in the middle of the back of the backpack near the top edge of the back of the backpack. In this alternative embodiment, there are two patches of reflective and refractive material 1940 on the back of the backpack, one on either side (left and right) of the backpack. Two point light sources 1920 are mounted at the end of hinged arm 1920 away from the backpack. One point light source is set to shine on the left hand patch of reflective and refractive material, and the other to shine on the right hand patch of reflective and refractive material. In this embodiment, which, if any, point light source is on at a specific time is controlled by a remote control accessible to the wearer of the backpack while wearing the backpack.

Example 6: A Speaker Cover that Changes Color and Intensity in Response to the Sound Emitted by the Speaker Example 6: a speaker cover that changes color and intensity in response to the sound emitted by the speaker. The surface inside, or around the speaker can play with light.

Figure 9:
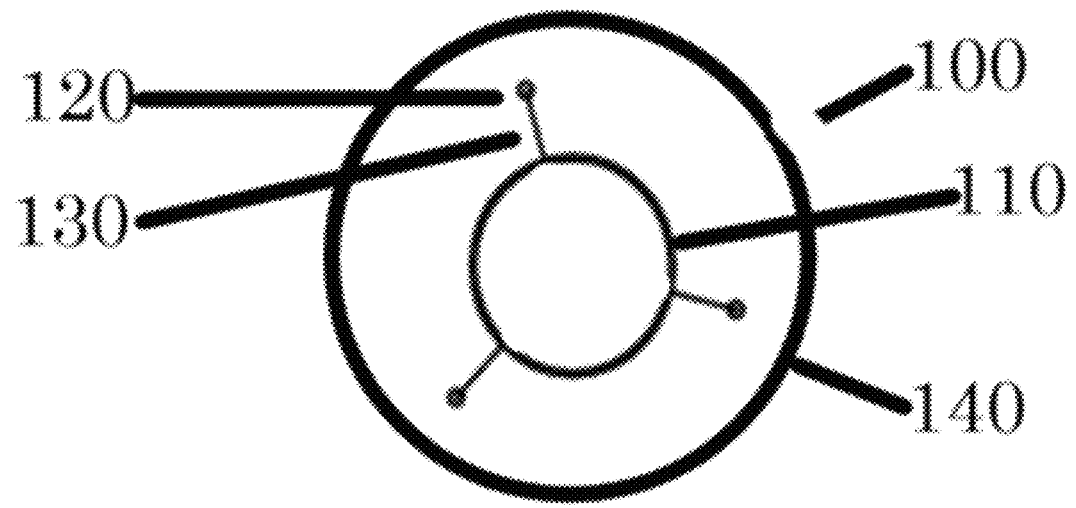
FIG. 9 is a top view of a speaker having an array of lighting pins mounted on the exterior of a cylindrical speaker.

Turning to FIG. 9 is a top view of speaker 100 which can change its exterior color and the intensity of the exterior color in response to the sound emitted by the speaker.

The exterior of speaker 100 is covered with reflective and refractive surface 110 of the present invention. Reflective and refractive surface 110 has a plurality of perforations so that the sound emitted by the speaker can reach listeners in the vicinity of speaker 100. An array of lighting pins 130 mounted on the exterior of a cylindrical speaker and a point light source 120 is located on each lighting pin 130 near the end of the pin furthest from reflective and refractive surface 110. The light from each of the point light sources 120 is directed towards reflective and refractive surface 110. This light, after interacting with the reflective and refractive surface 100, returns to vicinity of the point light source forming a glass bow.

In a preferred embodiment of the speaker cover of the present invention, the point light sources emit red, green, or blue light, and the power to each point light source is controlled by a computing device that is programed to alter to color of the light, as well as the intensity of the colors in response to the music.

In a further preferred embodiment of the speaker cover of the present invention, the speaker and the lighting pins (and hence any glass bows) are within another cylinder 140 that has a plurality of perforations so an observer looking at the speaker can see the colors and changes to the colors as they occur.

Example 8: A Moisture Indicator

Example 8: a moisture/particle/smoke indicator—when the microsphere surface is blocked by smoke, moisture or anything at all, the glass bow effect will not appear. It can show when something is full or empty.

In an alternative use of a glass bow producing apparatus of the present invention, the presence of a glass bow is monitored by a computing device. In the event that the path of the point light source is blocked by smoke, moisture of other materials, the computing device detects the absence of the glass bow and issues an alert.

Figure 14A:
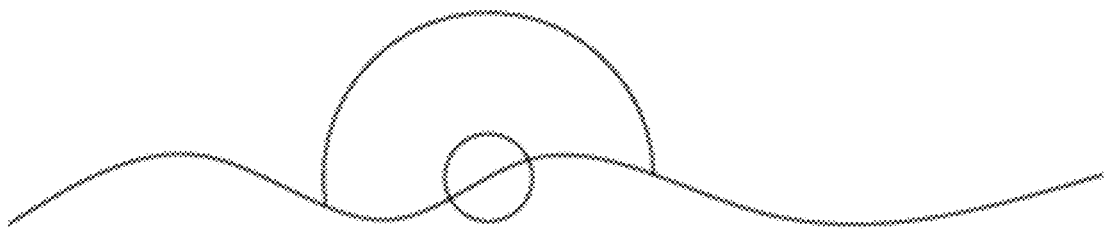
FIG. 14A is an illustration of a flood condition that can interfere with the creation of a glass bow.
Figure 14B:
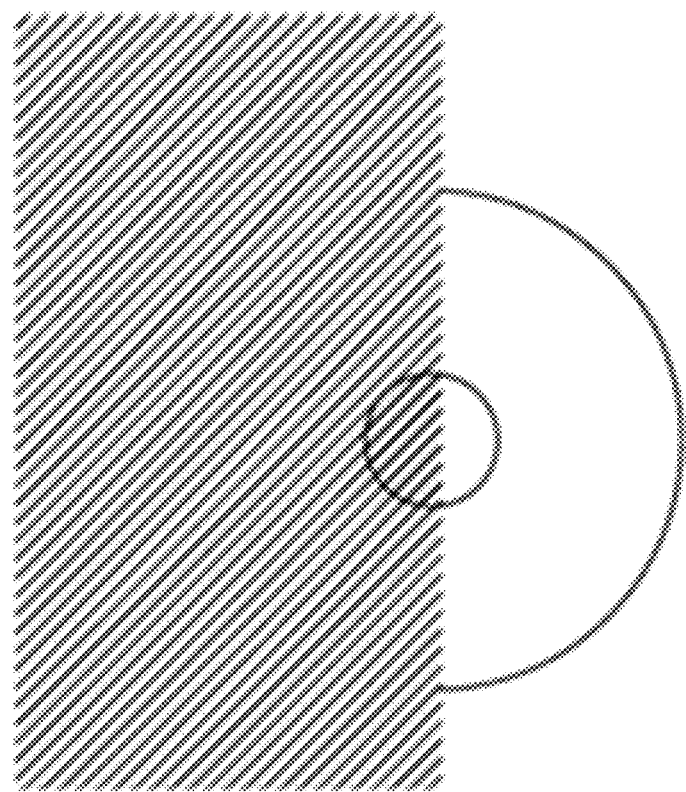
FIG. 14B is an illustration of a smoke condition that can interfere with the creation of a glass bow.

FIGS. 14A and 14B illustrate conditions that will interrupt the light path from the point light source to the reflective and refractive material. Specifically, FIG. 14A shows an example of a water level rising so that it interrupts the light path from the point light source to the reflective and refractive material. Correspondingly, FIG. 14B shows an example of a smoke condition that interrupts the light path from the point light source to the reflective and refractive material.

Example 9: A UV/Infrared Light Reflector

Example 9: a UV/infrared reflector—a surface that allows light to reflect back more efficiently. Can be used in heat lamps and grow lamps. Can be seen with special devices (UV or infrared sensitive goggles). Makes these lights more energy efficient.

Example 10: A Label

Example 10: a label—a label on a product that has a glass bow light effect.

Figure 10A:
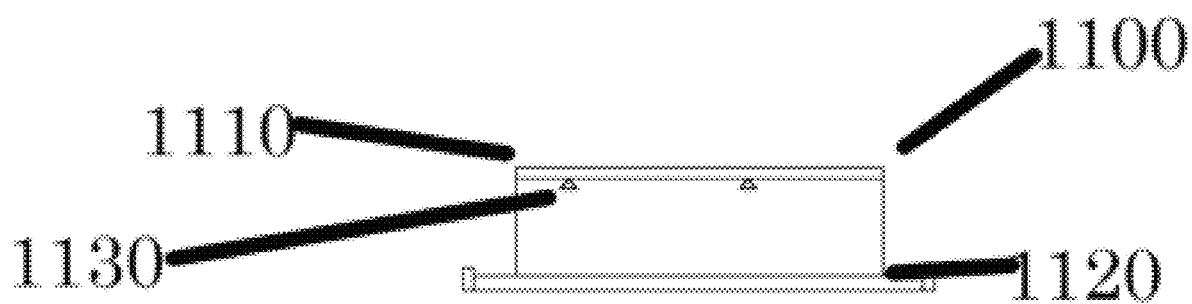
FIG. 10A is a top view of a label embodiment of the present invention.

Turning to FIG. 10A, a side view of a label embodiment of the present invention. Label 1100 has a back member 1120 which has a forward facing surface including a reflective and refractive surface. Label 1100 also has front member 1110 connected to and positioned in front of back member 1120. Front member 1110 has one or more apertures (not seen in this view) in which a point light source is positioned so that it shine on the reflective and refractive surface of back member 1120.

Figure 10B:
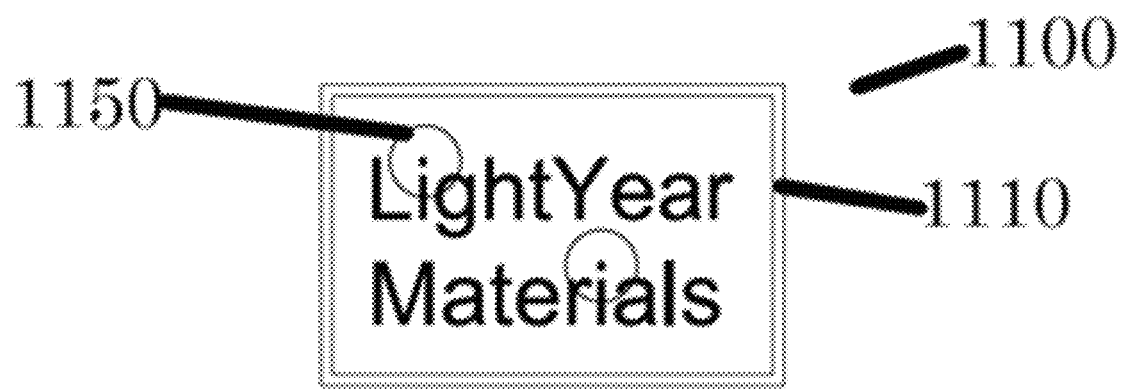
FIG. 10B is a front view of a label embodiment of FIG. 10A the present invention.

FIG. 10B shows a front view of a label embodiment of the present invention. Label 1100 has a name with two i's printed on front 1110. Where the dot of each i goes, is aperture 1150. At the center of each aperture 1150 is a point light source pointed toward the back member of label 1100. When this point light source is illuminated, a glass bow appears about the dot of each "i". Alternatively, the point light source is illuminated.

Not shown in FIGS. 10A and 10B is a power source for the point lights. In an alternative embodiment of the label of the present invention, there is also provided a computing device to create variations in the glass bow. For instance, the computing device could reduce and increase the power to each point light source so as to cause the glass bows to flicker.

Example 11: A Badge

Example 11: a badge—similar to a label, but this device can be removed and reused on other necessary objects such as a luggage tag, name tag or pin.

Example 12: A Device to Blend Colored Light

Example 12: a device to blend colored light—could be used in a lightbulb, toys, remote controls to change colors of lightbulbs on a remote or within a lightbulb or light fixture, it could be a desk toy, a keyboard or button. It can be one or more LED lights mixing together, it can be on a grid or mesh containing led's. The LED's don't have to be next to each other, that can be on different planes. They can be made from one device or two or more coming together.

Example 13: A Proximity Detector

Example 13: proximity detector—mixes color when close. Something interrupts sphere of light. Could be used in toys and sensors. It could be two or more spheres of light coming together to detect proximity or one sphere coming into proximity with an object or surface.

Figure 16A:
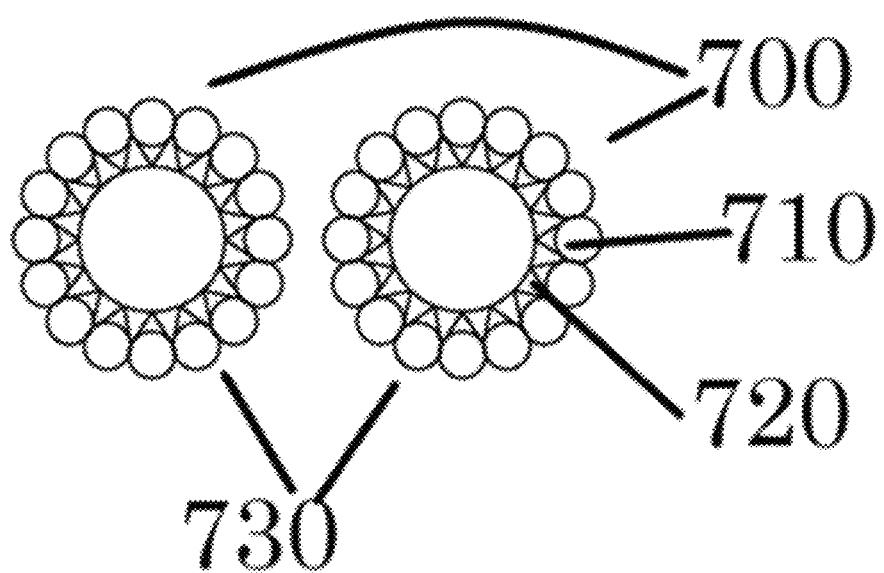
FIG. 16A is a top view of two objects each having a perimeter of glass bows according to the present invention.
Figure 16B:
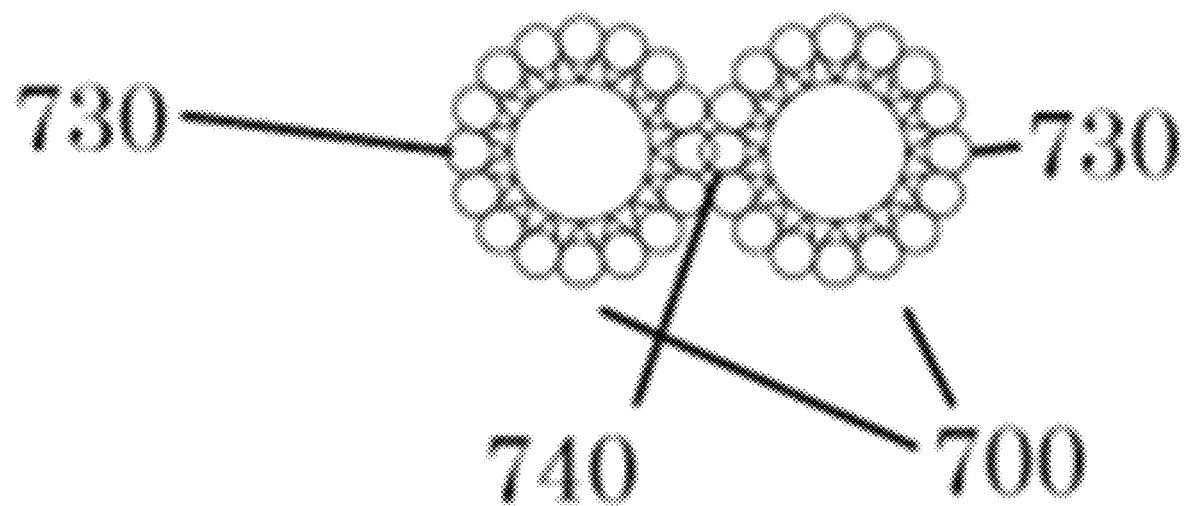
FIG. 16B is a top view of the two objects of FIG. 16A where they have moved so that they now have overlapping perimeter glass bows.

FIG. 16A shows two objects 700. The perimeter of each object 700 has a plurality of point light sources 710 positioned away from object 700 and shining their light on a reflective and refractive surface 720 that covers the circumference of each object 700. As a result, there are a plurality of glass bows 730 projecting from the perimeter of each object 700.

FIG. 16C also shows objects 700 in a position in which some of glass bows 730 from each object 700 overlaps at 740. Such an overlap of glass bows, in the region of overlap, can be detected by either a change in color or in intensity in the overlap region.

Example 14

A detector for determining whether a drawer or door is opened.

Figure 15A:
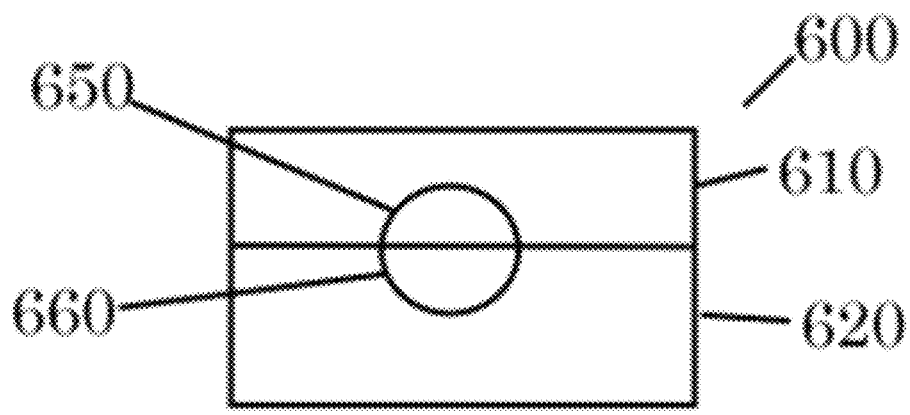
FIG. 15A is an illustration of a front view of two drawers in alignment onto which a glass bow has been projected in accordance with the present invention.
Figure 15B:
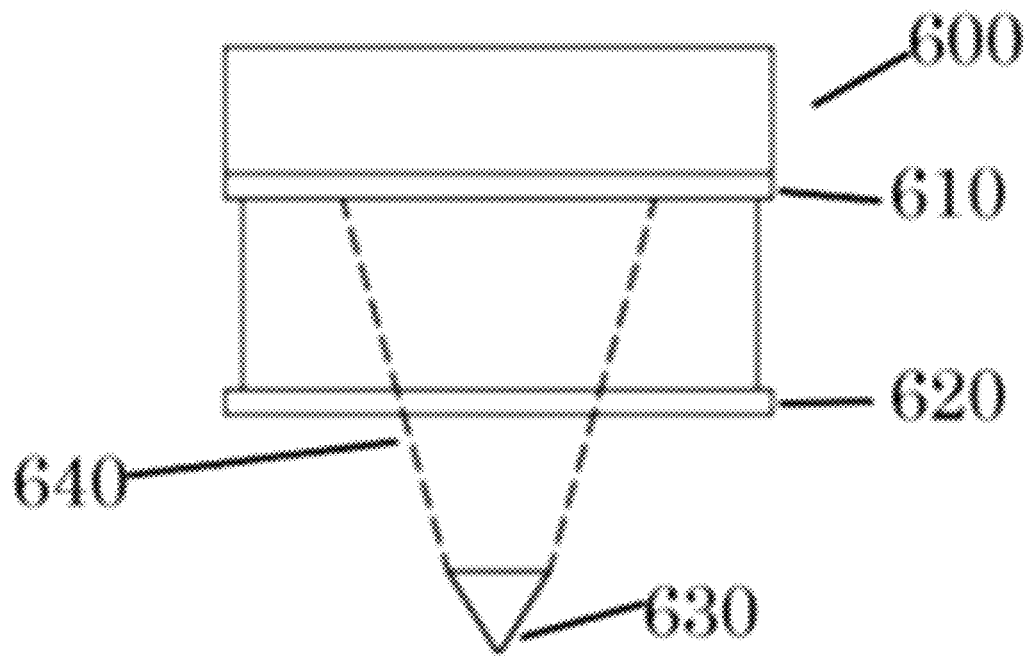
FIG. 15B is a top view of two drawers, the lower of which has been pulled out and the drawers are no longer in alignment.
Figure 15C:
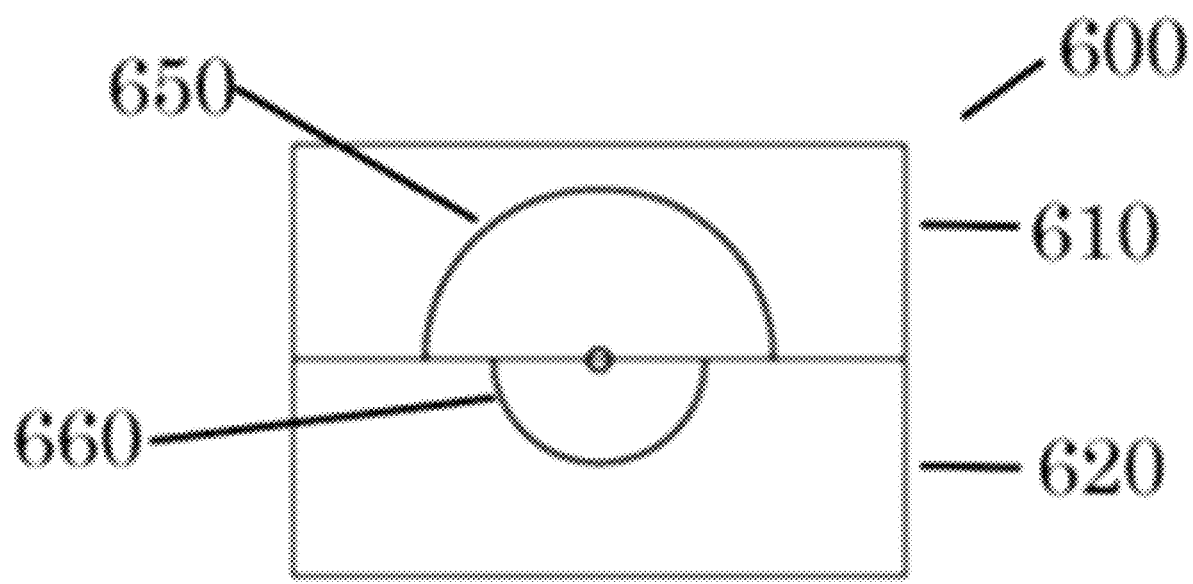
FIG. 15C is front view of two drawers, the lower of which has been pulled out and the drawers are no longer in alignment.

FIGS. 15A, 15B, and 15C illustrate an embodiment that determines whether a drawer, or door, has been opened. FIG. 15A shows a front view of two drawers (610 and 620) in alignment (i.e., both are closed, or both are pulled out the same amount). A glass bow projected on the two drawers in alignment has the same radius on each drawer (650 and 660).

FIG. 15B is a top view of drawers 610 and 620 where lower drawer 620 has been pulled out. Also shown in this figure is point light source 630 projecting a glass bow cone onto the drawers.

FIG. 15C is a front view of drawers 610 and 620 as shown in FIG. 15B. Because lower drawer 620 has been pulled out, the glass bow projected on its front has a smaller radius than the glass bow projected on the front surface of top drawer 610.

By monitoring the size of the glass bow projected on these drawers, a computing device can determine whether either of these drawers was opened during the monitoring, and if a drawer was opened, the computing device can determine which drawer was opened and for how long.

Example 15

Figure 12:
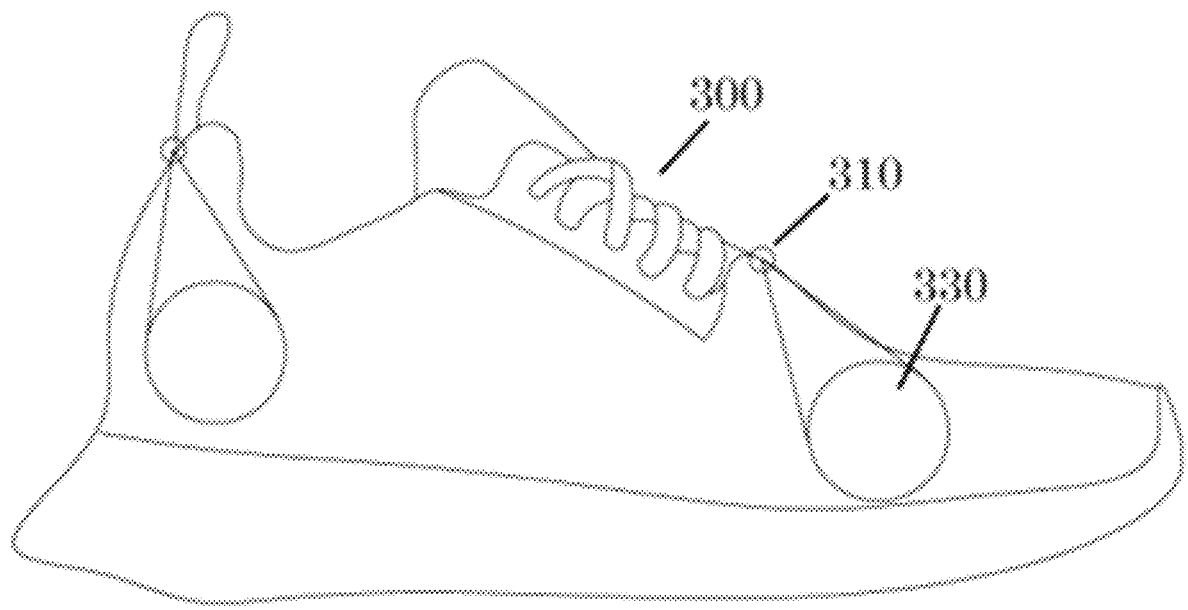
FIG. 12 is a side view of a sneaker embodiment of the present invention.

FIG. 12 shows a sneaker embodiment of the present invention. Sneaker 300 has a plurality of point light sources 310 mounted on its exterior. For instance, point light source 310 could be mounted, or attached, to an eyelet on sneaker 300. In an alternative embodiment, point light source 310 is the end of a fiber optic wave guide. In the fiber optic wave guide embodiment, the wave guide may be woven into the fabric of sneaker 300. In either embodiment, there is a power source for the light attached to, but not shown, on sneaker 300.

Sneaker 300 also has one, or more, surface regions that include a reflective and refractive material 330. Point light source 310 is arranged to shine on reflective and refractive material 330.

Example 16

An umbrella incorporating a device for creating a glass bow of the present invention.

Figure 11A:
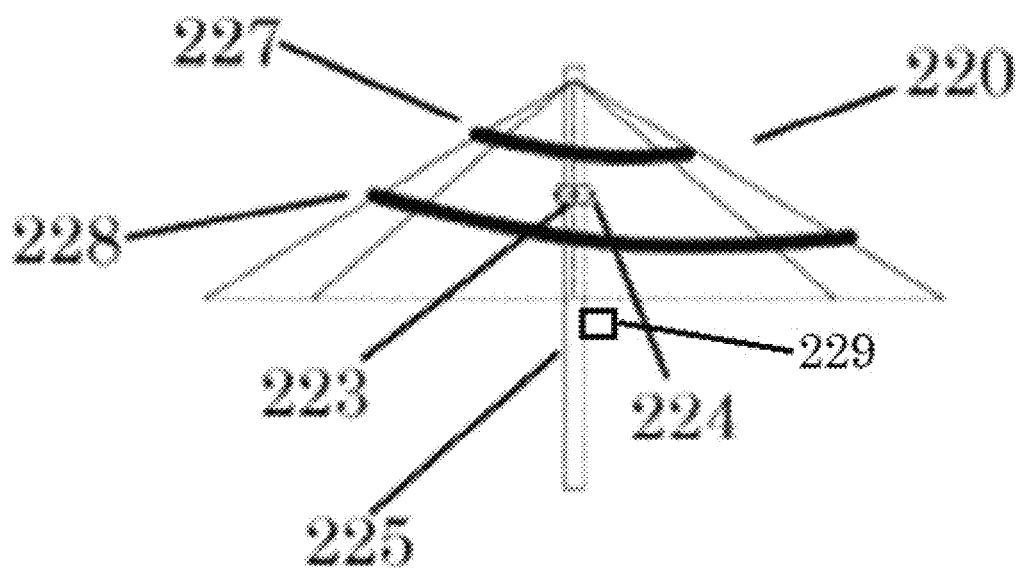
FIG. 11A is a side view of an umbrella embodiment of the present invention in which the umbrella covering is transparent as is the reflective and refractive strip on the inside of the umbrella.

FIG. 11A shows umbrella embodiment 220 of the present invention, albeit with a transparent covering. Mounted on shaft 225 of umbrella 220, above the bottom edge of the umbrella covering, is ring 223, which is secured to shaft 225. Mounted on ring 223 are a plurality of point light sources 224. The inside of umbrella 220 also is lined with a reflective and refractive material between circles 227 and 228. Point light sources 224 are in electrical communication with a power source not shown. Also shown is switch 229 to turn the point light sources on or off.

Figure 11B:
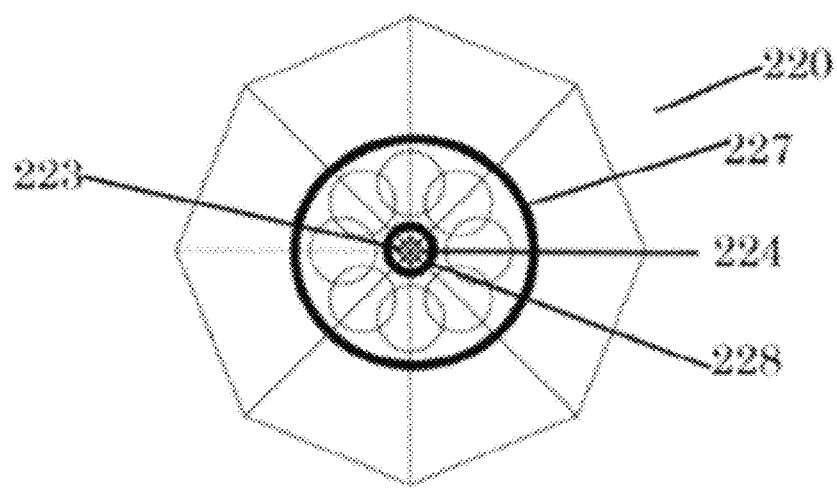
FIG. 11B is a top view of the umbrella embodiment of FIG. 11A of the present invention in which the umbrella covering and the reflective and refractive strip on the inside of the umbrella is are both transparent.

FIG. 11B is a top view of umbrella 220 shown in FIG. 11A. FIG. 11B also shows ring 223 and point light sources 224, as well as the upper 228 and lower 227 ends of a reflective and refractive material lining the inside of umbrella 220.

In the embodiment of FIGS. 11A and 11B, when the point light sources are on, they shine on the reflective and refractive material and create glass bows inside umbrella 220.

In an alternative embodiment of umbrella 220, the point light sources are mounted in shaft 225 and not in ring 223.

Example 17

A Desk Lamp Embodiment of the Present Invention

Figure 13A:
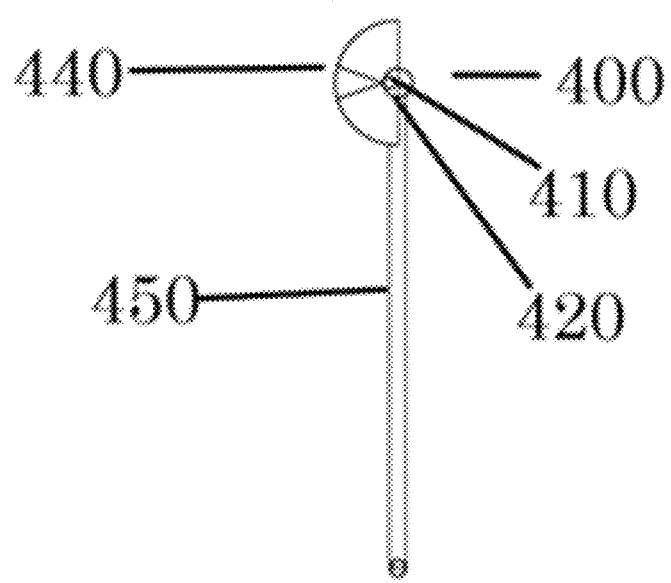
FIG. 13A is a side view of a desk lamp embodiment of the present invention.

FIG. 13A is a side view of a desk lamp of the present invention. Desk lamp 400 has wire 450 connected to rotatable joint 420 in which point light source 410 is mounted. In an alternative embodiment, wire 450 is encased in a flexible metal tube to provide support for desk lamp 400.

Desk lamp 400 also includes shade 440. Shade 440 is mounted to rotatable joint 420 so that point light source 410 always shines directly on the interior of shade 440. Additionally, at least a portion of the interior of shade 440 is coated with a reflective and refractive material. It is preferred that at least the middle fifth of the interior of shade 440 is coated with a reflective and refractive material.

Figure 13B:
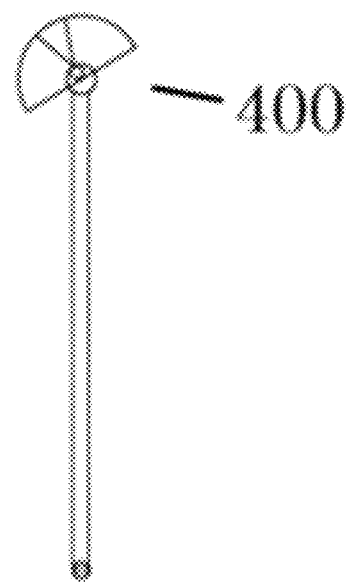
FIG. 13B and FIG. 13C are alternative side views of the desk lamp embodiment of FIG. 13A in which the shade has been rotated.
Figure 13C:
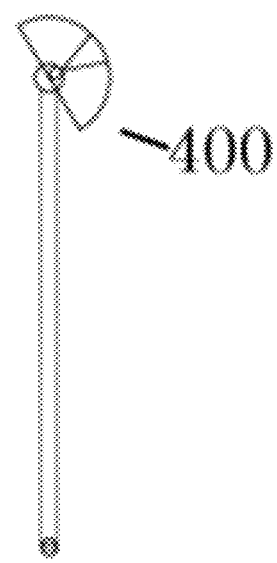

FIGS. 13B and 13C are alternative side views of the desk lamp embodiment of FIG. 13A with shade 440 rotated into different positions.

Figure 13D:
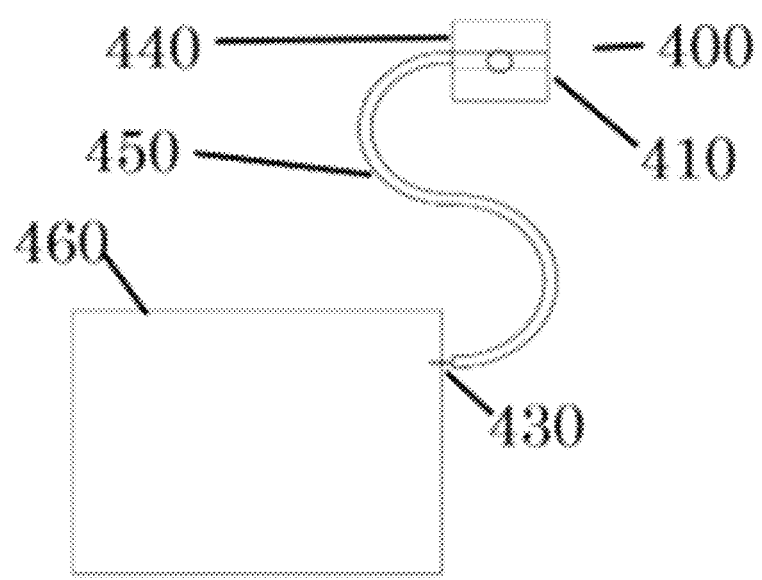
FIG. 13D is a further side view of the desk lamp embodiment of FIG. 13A connected to a computer.

FIG. 13D is another alternative side view of the desk lamp embodiment of FIG. 13A in which wire 450 is connected to a USB port on a laptop computer.

Example 18

A Prior Art Embodiment of a Pop-Up Card

Figure 19A:
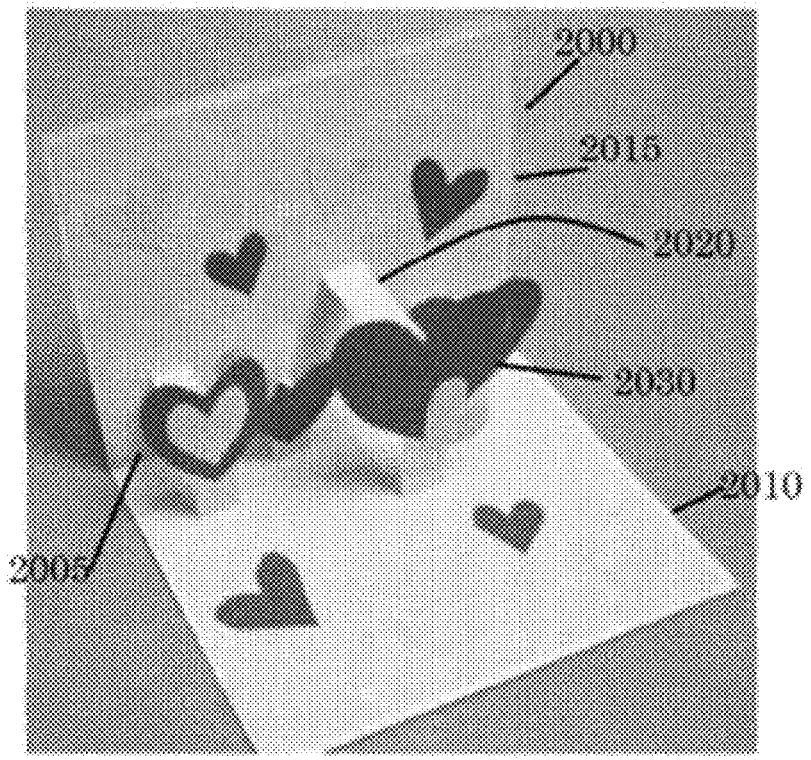
FIGS. 19A-19D illustrate a prior art popup card.

FIG. 19A shows a prior art popup card 2000. The prior art popup card 2000 has two panels, 2010 and 2015 that are on either side of crease 2005. Prior art popup card 2000 also has a notch 2020 formed between two slits cut in panels 2010 and 2015 about crease 2005. When the prior art popup card 2000 is opened, panels 2010 and 2015 can be moved into an approximately right angle about crease 2005. Additionally, when prior art card 2000 is opened, object 2030, which is adhered to the leg of notch 2020 that is attached to panel 2010, "pops up".

Figure 19B:
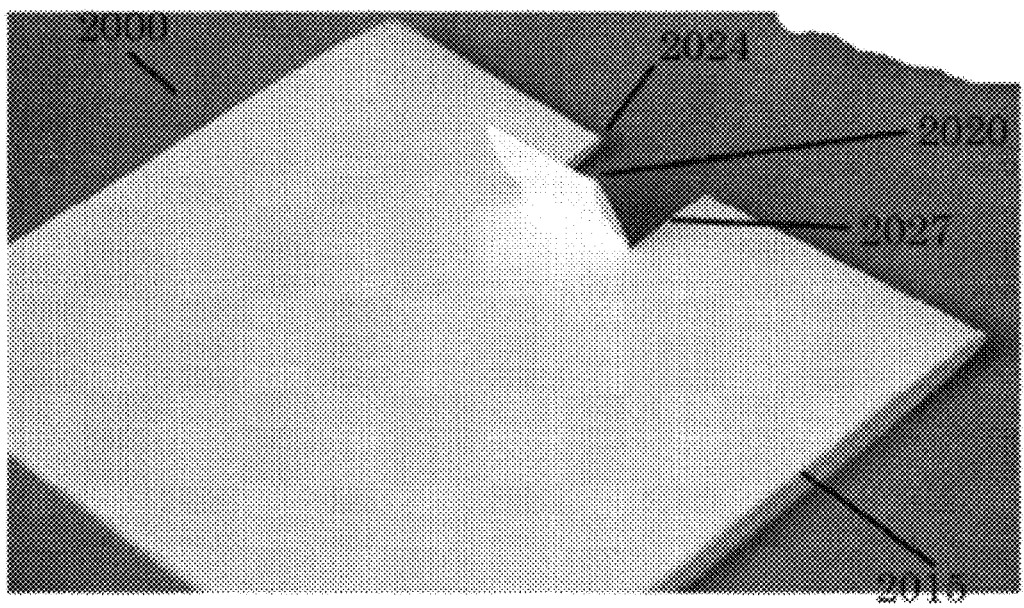

FIG. 19B provides a view of how notch 2020 is formed in prior art popup card 2000. Parallel slits 2024 and 2027 are cut into panels 2010 and 2015 to form notch 2020.

Figure 19C:
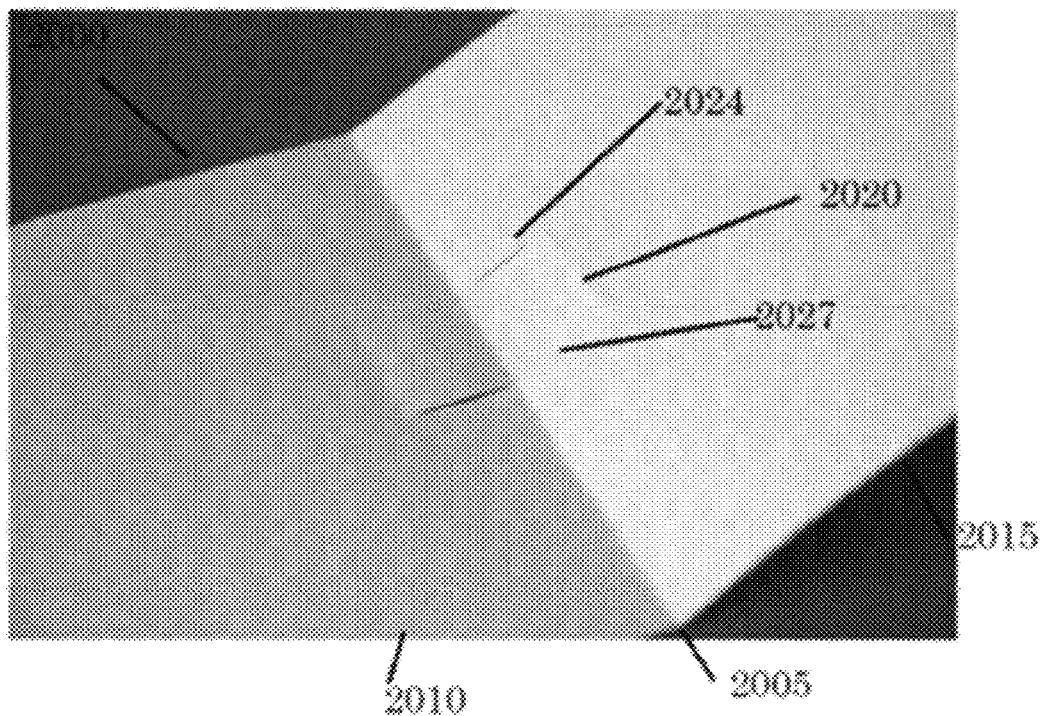

FIG. 19C provides a view of prior art popup card 2000 when opened after slits 2024 and 2027 are cut into panels 2010 and 2015 to form notch 2020.

Figure 19D:
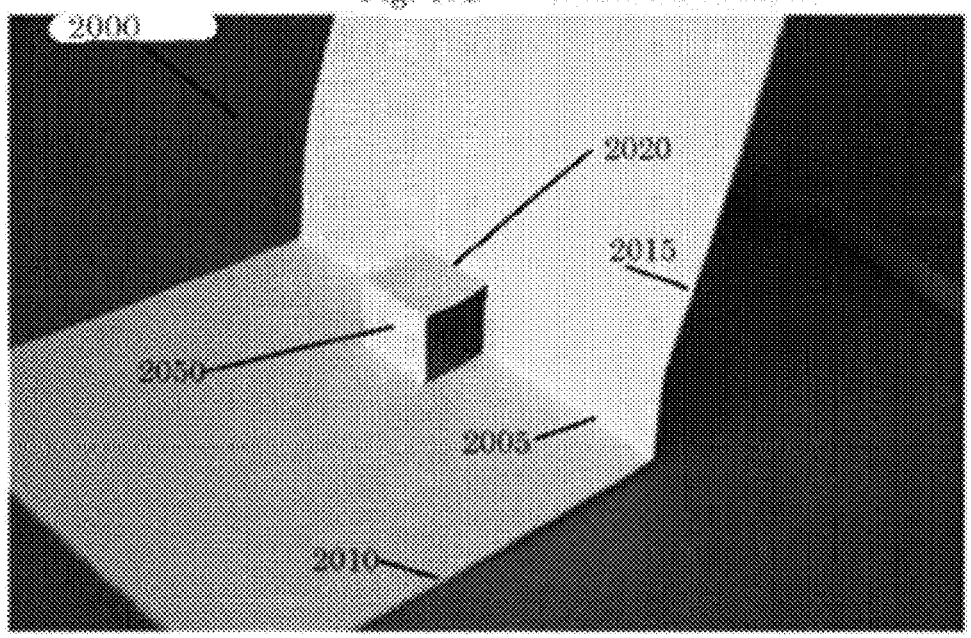

FIG. 19D provides a view of prior art popup card 2000 after notch 2020 has been cut in panels 2010 and 2015 and notch 2020 has been pushed up. In prior art pop up card 2000, the object that is to popup when the card is opened is adhered to surface 2015 of notch 2020.

Example 19

A Popup Card Embodiment of the Present Invention

Figure 20A:
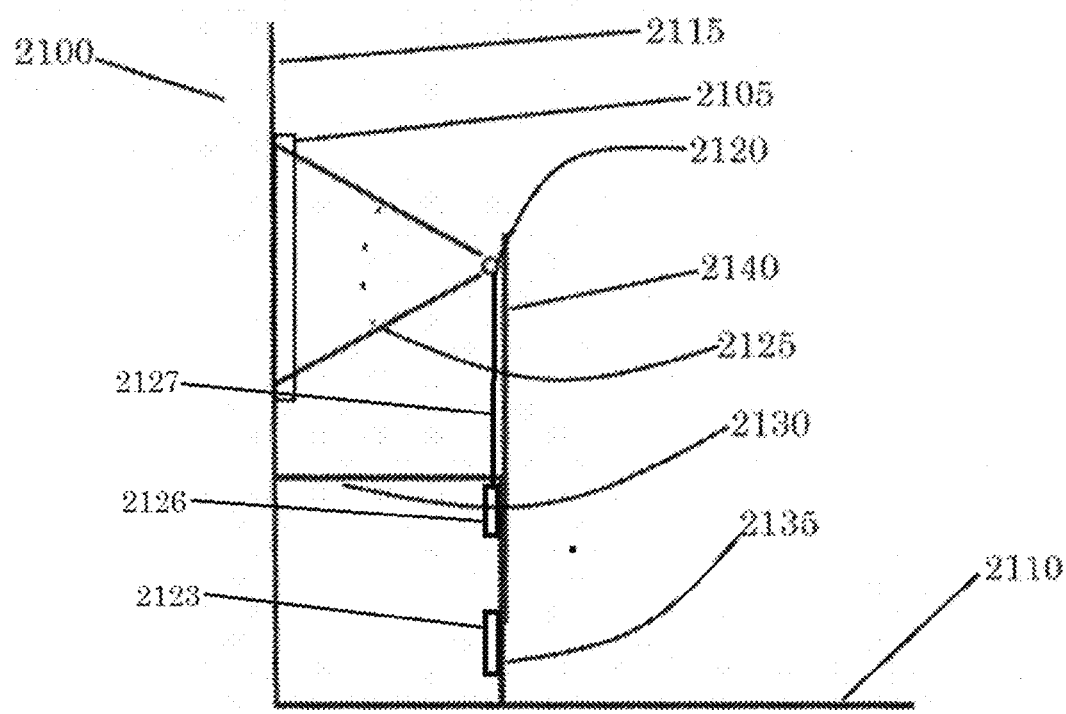
FIGS. 20A-20H illustrate an opened popup card embodiment of the present invention.
Figure 20B:
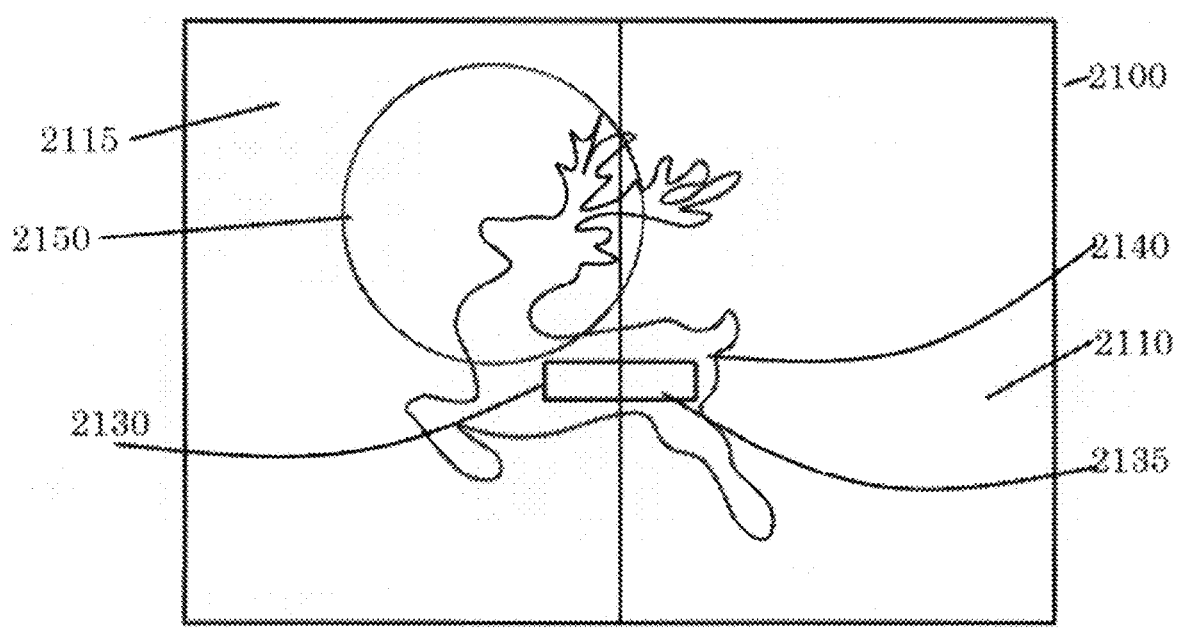
Figure 20C:
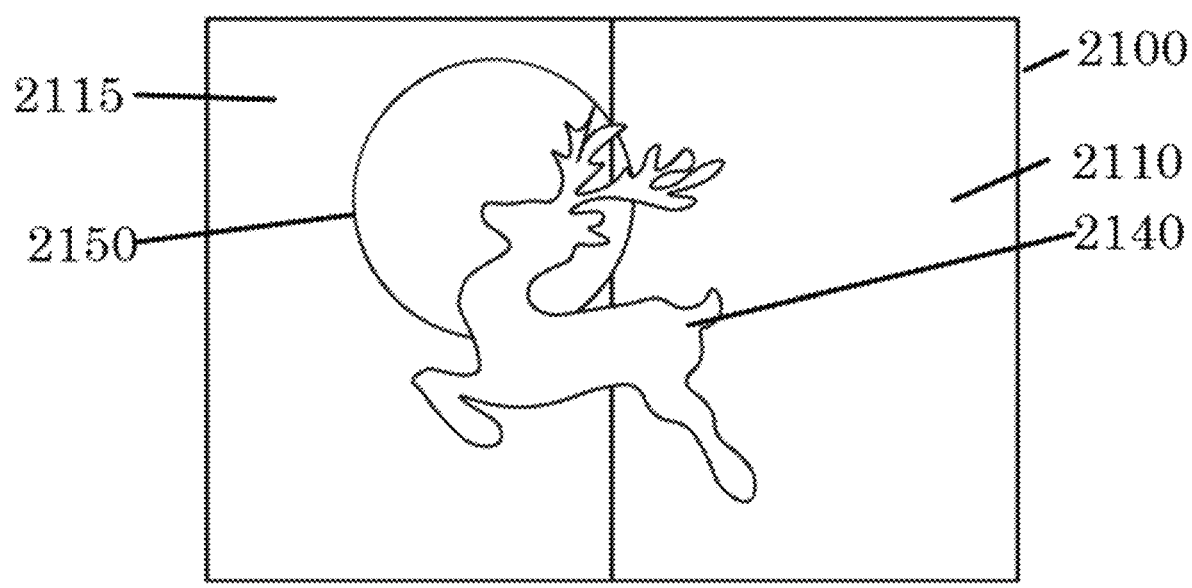
Figure 20D:
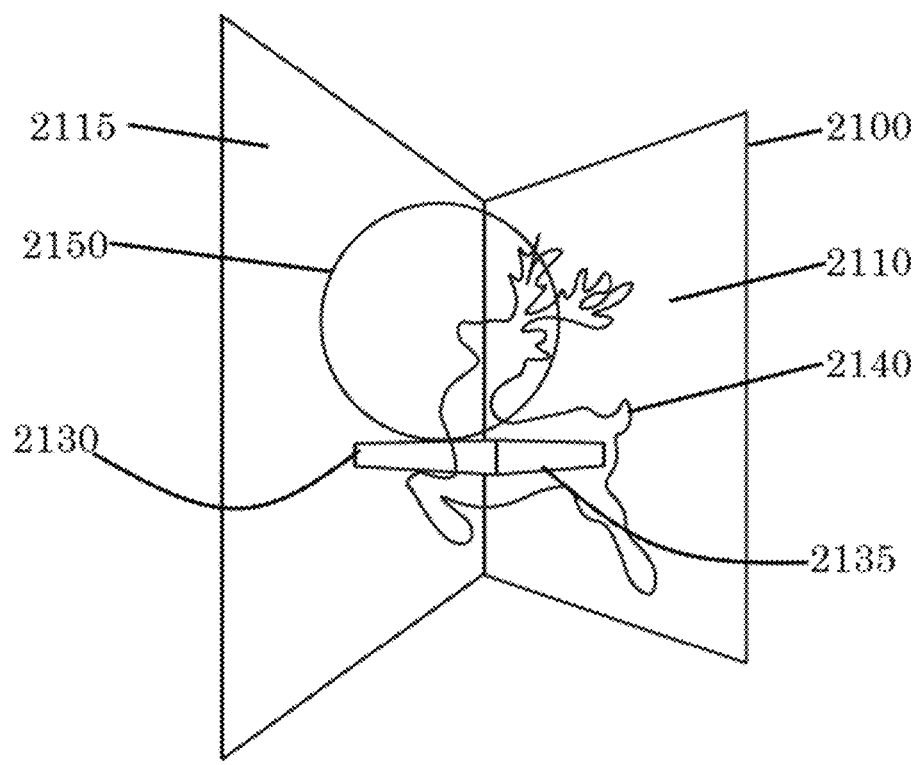
Figure 20E:
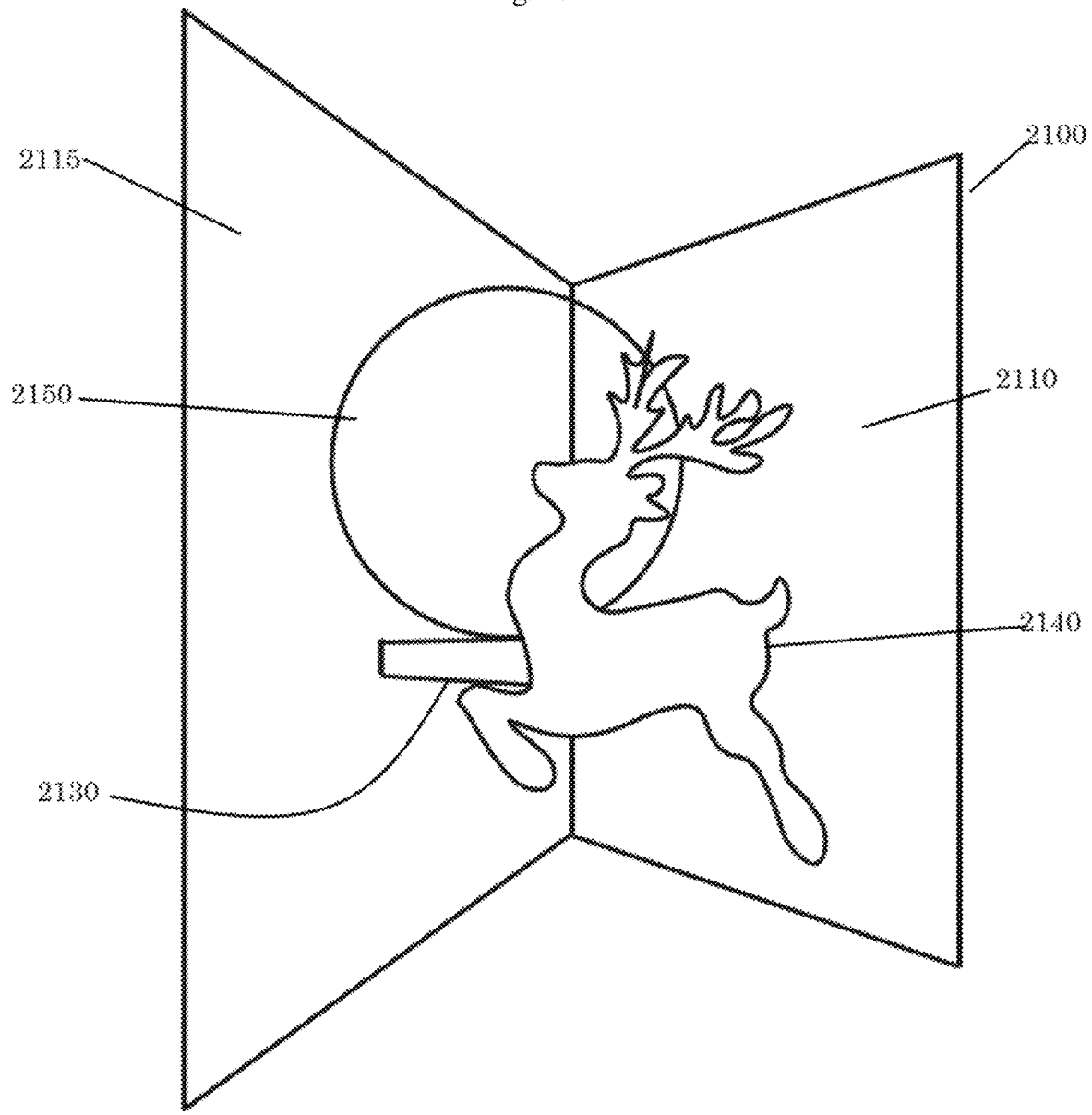

Card 2100 of FIG. 20A illustrates a popup card of the present invention. On panel 2115 of popup card 2100 there is a reflective and refractive surface 2105 on the surface of panel 2115. This reflective and refractive surface will generally have an RA (cd/lux/m2) (5, 12) of between about 0.2 and about 250. However, it is preferred that the reflective and refractive surface has an RA (cd/lux/m2) of between about 0.3 and about 50. It is further preferred that the reflective and refractive surface has an RA (cd/lux/m2) of between about 0.3 and about 50.

Additionally, card 2100 has a point light source 2120 on the side of object 2140 facing reflective and refractive surface 2105. In a preferred embodiment, point light source 2120 is positioned so that when the popup card is opened, it is positioned near the center of reflective and refractive surface 2105. Not shown in FIG. 20A is a power source, for instance a battery, and a circuit connecting the power source to point light source 2120, as well as a switch that closes the circuit and provides power to point light source 2120 when card 2100 in opened.

Figure 20:
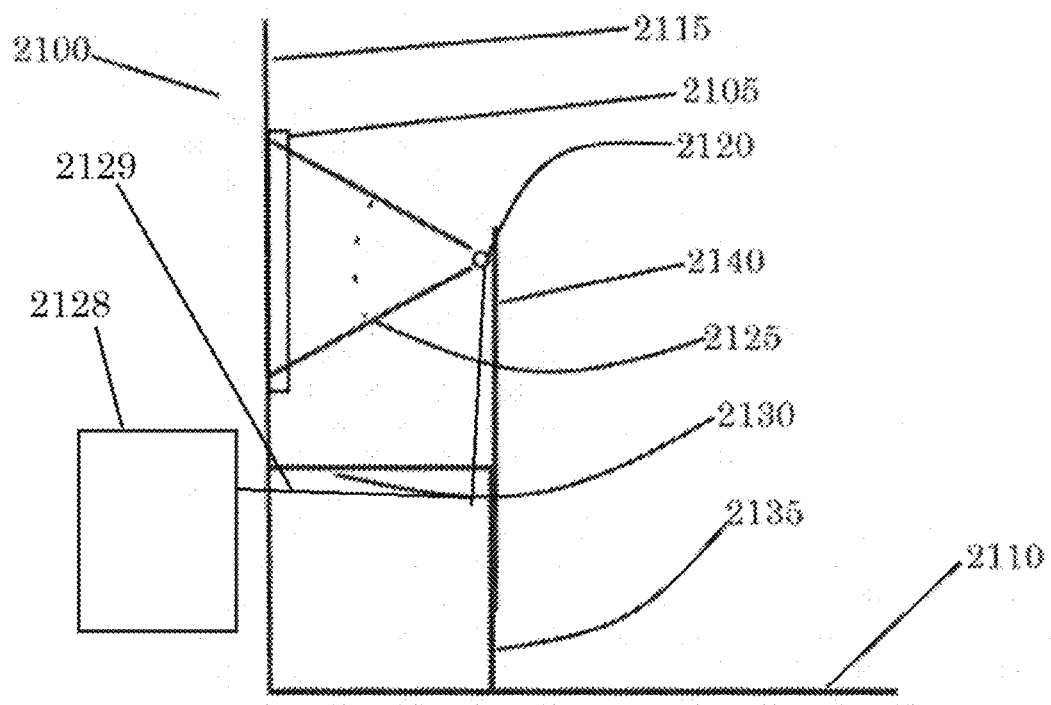
Figure 20:
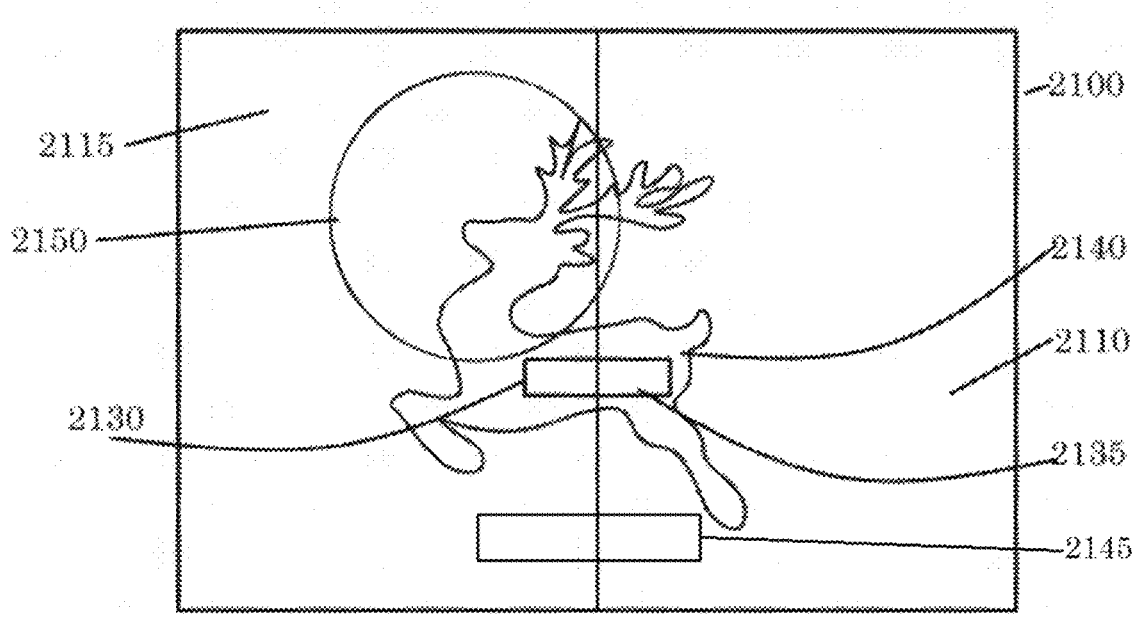

FIG. 20 also shows that point light source 2120 shines a cone of light 2125 on reflective and refractive surface 2105.

FIG. 20 also shows that popup card 2100 also has a second panel 2110, and the popup mechanism formed by strips 2130 and 2135.

In an alternative embodiment of card 2100 of the present invention, card 2100 has a second point light source also located on the side of object 2140 facing surface 2105, which when powered, the light from the second point light source is reflected and refracted and produces a second nimbus about another edge of object 2130. In a further embodiment of card 2100 of the present invention, the light from the first and the second point light sources have different wavelengths of visible light.

FIGS. 20B, 20C, 20D, 20E, 20F, and 20G further illustrate an embodiment of popup card 2100 of the present invention. In this embodiment, shining point light source 2120 on the reflective and refractive surface 2105 produces a glass bow (nimbus) about an edge of object 2140. In these figures, the reflective and refractive surface 2105 is on a portion of panel 2110 and on a portion of panel 2115. FIG. 20A also shows battery 2123, switch 2126, and circuit 2127. FIG. 20F also shows an external power source (e.g., a solar panel) 2128 which is connected to a point light source 2120. FIG. 20G shows a second opaque object 2145.

Example 20

A Popup Book Embodiment of the Present Invention

One embodiment of a Pop-up Book of the present invention is formed by adhering one of the exterior panels of a first popup card embodiment to an exterior panel of a second popup card.

Although the particular embodiments shown and described above will prove to be useful in many applications in the advertising and other display arts to which the present invention pertains, further modifications of the present invention will occur to persons skilled in the art. All such modifications are deemed to be within the scope and spirit of the present invention as defined by the appended claims.

What I claim is:

1. A pop-up having a collapsed and a popped-up state comprising a glass bow wherein the improvement comprises:
    a. a reflective and refractive surface having a retroreflection coefficient, $R_A$ (cd/lux/m2) (5°, 12°) of between about 0.2 and about 250;
    b. positioned between about 1 and 17 cm in front of said reflective and refractive surface, a shaped opaque object having a front and a back side, said front side of said shaped object facing away from the reflective and refractive surface and said back side of said shaped object facing said reflective and refractive surface as well as an edge forming a perimeter of said shaped object;
    c. said edge of said opaque object having an aspect about which a nimbus can be created,
    d. mounted on said back side of said shaped object, between about 5 mm and 2 cm from said aspect of said shaped object to have a nimbus and between about 5 mm and about 17 cm from said back side in the direction of said reflective and refractive surface is a point light source that shines on said reflective and refractive surface, and
    e. a power source in communication with said point light source to turn said point light source on.

2. The pop-up of claim 1 in which the object including the pop-up is a greeting card.

3. The pop-up of claim 1 in which the object including the pop-up is a book.

4. The pop-up of claim 3 in which said power source comprises an external solar panel.

5. The pop-up of claim 4 in which said external solar panel is in connectable communication with said point light source.

6. The pop-up of claim 1 further comprising a switch that closes a circuit to said point light source when said pop-up is popped-up.

7. The pop-up of claim 1 in which the retroreflection coefficient, $R_A$ (cd/lux/m2), of said reflective and refractive surface is between about 0.3 and about 50.

8. The pop-up of claim 1 in which the retroreflection coefficient, $R_A$ (cd/lux/m2), of said reflective and refractive surface is between about 0.3 and about 30.

9. The pop-up of claim 1 in which said power source comprises a battery.

10. The pop-up of claim 1 further comprising a second opaque object having an aspect about which a nimbus can be created.

11. The pop-up of claim 1 in which said power source is external to said pop-up and removably connected to said point light source.

* * * * *